(12) United States Patent
Oh

(10) Patent No.: US 8,200,288 B2
(45) Date of Patent: Jun. 12, 2012

(54) COMMUNICATION TERMINAL AND DISPLAYING METHOD THEREOF

(75) Inventor: Joon Oh, Seoul (KR)

(73) Assignee: LG Electronics Inc., Seoul (KR)

(*) Notice: Subject to any disclaimer, the term of this patent is extended or adjusted under 35 U.S.C. 154(b) by 730 days.

(21) Appl. No.: 12/209,834

(22) Filed: Sep. 12, 2008

(65) Prior Publication Data
US 2009/0137277 A1    May 28, 2009

(30) Foreign Application Priority Data
Nov. 23, 2007   (KR) .................. 10-2007-0120120

(51) Int. Cl.
*H04M 1/00* (2006.01)
*G06F 17/00* (2006.01)

(52) U.S. Cl. .................. 455/564; 455/566; 715/277

(58) Field of Classification Search .................. 455/566, 455/574, 564, 565, 550, 556; 382/182; 715/234, 715/237, 216, 247, 253, 210
See application file for complete search history.

(56) References Cited

U.S. PATENT DOCUMENTS

| | | | |
|---|---|---|---|
| 7,251,774 B2* | 7/2007 | Sunata | 715/234 |
| 7,474,903 B2* | 1/2009 | Kim et al. | 455/550.1 |
| 7,486,821 B2* | 2/2009 | Lim et al. | 382/182 |
| 2004/0252887 A1* | 12/2004 | Lim et al. | 382/182 |
| 2005/0002060 A1* | 1/2005 | Do | 358/1.17 |
| 2005/0153746 A1* | 7/2005 | Yoon | 455/566 |
| 2010/0220250 A1* | 9/2010 | Vanderwall et al. | 348/837 |

FOREIGN PATENT DOCUMENTS

| | | |
|---|---|---|
| EP | 1033878 A2 | 9/2000 |
| EP | 1501072 A1 | 1/2005 |
| GB | 2351631 A | 1/2001 |

* cited by examiner

*Primary Examiner* — Nay A Maung
*Assistant Examiner* — Cindy Trandai
(74) *Attorney, Agent, or Firm* — Birch, Stewart, Kolasch & Birch, LLP

(57) ABSTRACT

A communication terminal, computer program product and method thereof by which an image set for a phone number can be provided using a plurality of partial images in inputting a phone number to which a call signal will be transmitted. Also, a display for displaying information, a user input unit for inputting a plurality of digits configuring a phone number, and a controller for controlling the display to complete an image including at least one or more partial images by sequentially displaying the at least one or more partial images, when a plurality of the digits are inputted via the user input unit.

12 Claims, 25 Drawing Sheets

Call connecting...
019-9111-1234

COMMUNICATION TERMINAL AND DISPLAYING METHOD THEREOF

CROSS REFERENCE TO RELATED APPLICATIONS

This application claims the priority benefit of the Korean Patent Application No. 10-2007-0120120, filed on Nov. 23, 2007, which is hereby incorporated by reference as if fully set forth herein.

BACKGROUND OF THE INVENTION

1. Field of the Invention

The present invention relates to a communication terminal, and more particularly, to a communication terminal and displaying method thereof.

2. Discussion of the Related Art

A communication terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, communication terminals have been configured to receive broadcast and multicast signals which permit viewing of content such as videos and television programs.

Efforts are ongoing to support and increase the functionality of communication terminals. Such efforts include software and hardware improvements, as well as changes and improvements in the structural components which form the communication terminal.

A communication terminal according to a related art is capable of transceiving call signals with an external terminal. For instance, in transmitting a call signal, the communication terminal receives a phone number to which the call signal will be sent from a user and then sequentially displays a plurality of digits that configure the received phone number on a screen. In receiving a call signal, the communication terminal is able to display a phone number from which the call signal is sent on the screen to inform a user of a call signal reception.

However, a related art method of displaying a phone number of an incoming/outgoing call signal has a very restricted application.

Moreover, since a plurality of digits configuring a phone number are simply enumerated to announce a call signal reception/transmission, a user may get bored.

SUMMARY OF THE INVENTION

Accordingly, the present invention is directed to a communication terminal, computer program product and displaying method thereof that substantially obviate one or more problems due to limitations and disadvantages of the related art.

An object of the present invention is to provide a communication terminal, computer program product and method thereof, by which an image set for a phone number can be provided using a plurality of partial images in inputting a phone number to which a call signal will be transmitted.

Another object of the present invention is to provide a communication terminal, computer program product and displaying method thereof, by which an image set for a phone number from which a call signal was transmitted can be provided using a plurality of partial images in receiving the call signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a communication terminal according to the present invention includes a display for displaying information, a user input unit for inputting a plurality of digits configuring a phone number, and a controller for controlling the display to complete an image including at least one or more partial images by sequentially displaying the at least one or more partial images, when a plurality of the digits are inputted via the user input unit.

In another aspect of the present invention, a communication terminal includes a wireless communication unit for transmitting/receiving a call signal, a display for displaying information, and a controller for controlling the display to complete an image including at least one or more partial images by sequentially displaying the at least one or more partial images, when the call signal is received by the wireless communication unit.

In another aspect of the present invention, a displaying method of a communication terminal includes the steps of inputting a plurality of digits configuring a phone number and if a plurality of the digits are inputted, completing an image including at least one or more partial images by sequentially displaying the at least one or more partial images.

In a further aspect of the present invention, a displaying method of a communication terminal includes the steps of receiving a call signal and if the call signal is received, completing an image including at least one or more partial images by sequentially displaying the at least one or more partial images.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

Figure 1:
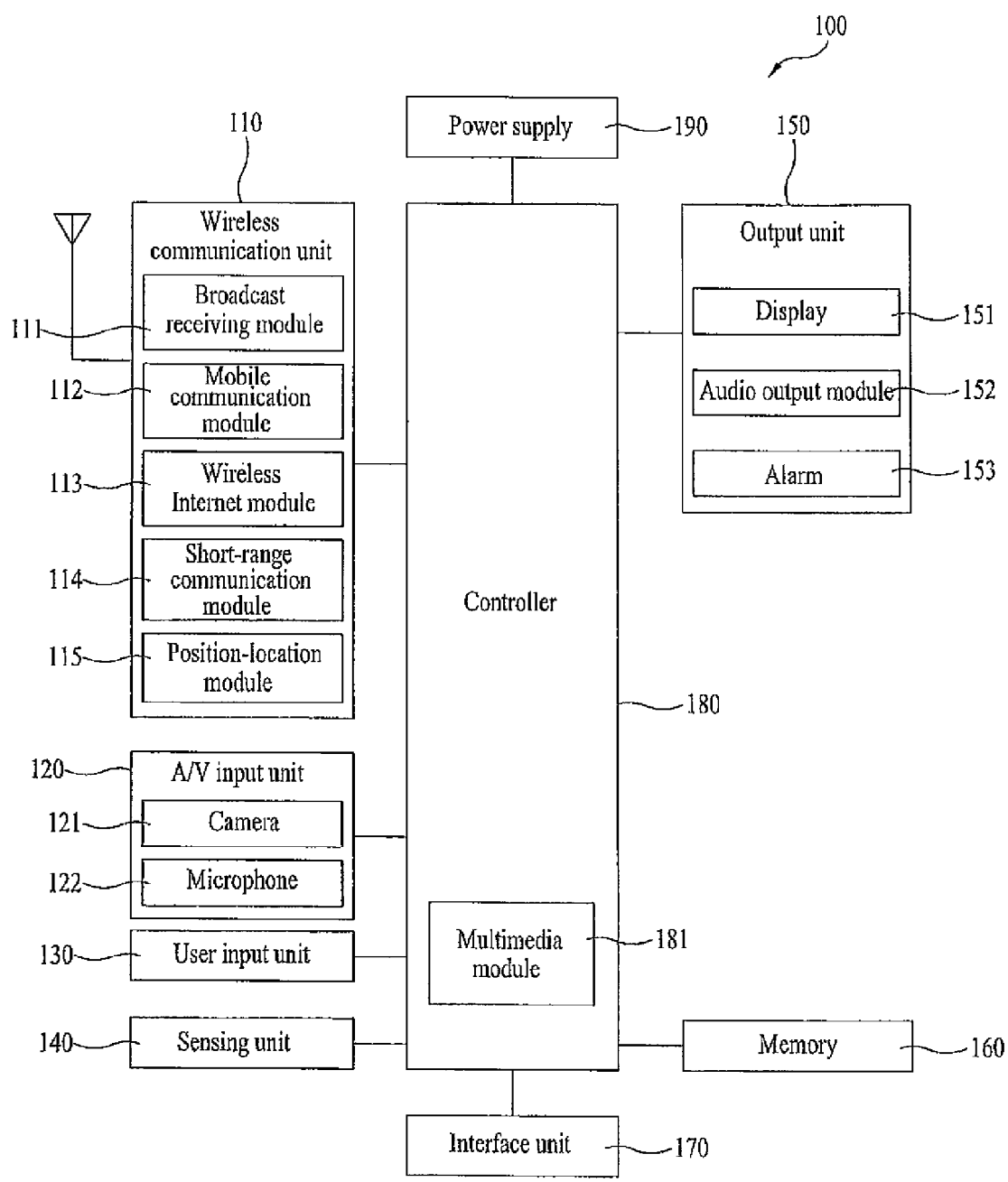
FIG. 1 is a block diagram of a communication terminal in accordance with an embodiment of the present invention.

FIG. 1 is a block diagram of communication terminal 100 in accordance with an embodiment of the present invention. The communication terminal may be implemented using a variety of different types of terminals. Examples of such terminals include mobile phones, user equipment, smart phones, computers, digital broadcast terminals, personal digital assistants, portable-multimedia players (PMP) and navigators. By way of non-limiting example only, further description will be with regard to a communication terminal. However, such teachings apply equally to other types of terminals. FIG. 1 shows the communication terminal 100 having various components, but it is understood that implementing all of the illustrated components is not a requirement. Greater or fewer components may alternatively be implemented.

FIG. 1 shows a wireless communication unit 110 configured with several commonly implemented components. For instance, the wireless communication unit 110 typically includes one or more components which permits wireless communication between the communication terminal 100 and a wireless communication system or network within which the communication terminal is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the communication terminal. This module may be internally or externally coupled to the terminal.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the communication terminal. If desired, this module may be implemented using global positioning system (CPS) components which cooperate with associated satellites, network components, and combinations thereof.

Audio/video (A/V) input unit 120 is configured to provide audio or video signal input to the communication terminal. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

The sensing unit 140 provides status measurements of various aspects of the communication terminal. For instance, the sensing unit may detect an open/close status of the communication terminal, relative positioning of components (e.g., a display and keypad) of the communication terminal, a change of position of the communication terminal or a component of the communication terminal, a presence or absence of user contact with the communication terminal, orientation or acceleration/deceleration of the communication terminal. As an example, consider the communication terminal 100 being configured as a slide-type communication terminal. In this configuration, the sensing unit 140 may sense whether a sliding portion of the communication terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the communication terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the communication terminal. Display 151 is typically implemented to visually display information associated with the communication terminal 100. For instance, if the communication terminal is operating in a phone call mode, the display will generally provide a user interface or graphical user interface which includes information associated with placing, conducting, and terminating a phone call. As another example, if the communication terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The communication terminal may include one or more of such displays. An example of a two-display embodiment is one in which one display is configured as an internal display (viewable when the terminal is in an opened position) and a second display configured as an external display (viewable in both the open and closed positions).

FIG. 1 further shows output unit 150 having an audio output module 152 which supports the audio output requirements of the communication terminal 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the communication terminal. Typical events include call received, message received and user input received. An example of such output includes the providing of tactile sensations (e.g., vibration) to a user. For instance, the alarm 153 may be configured to vibrate responsive to the communication terminal receiving a call or message. As another example, vibration is provided by alarm 153 responsive to receiving user input at the communication terminal, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the communication terminal. Examples of such data include program instructions for applications operating on the communication terminal, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the communication terminal. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

Communication terminal 100 may be implemented in a variety of different configurations. Examples of such configurations include folder-type, slide-type, bar-type, rotational-type, swing-type and combinations thereof. For clarity, further disclosure will primarily relate to a slide-type communication terminal. However such teachings apply equally to other types of terminals.

Figure 2:
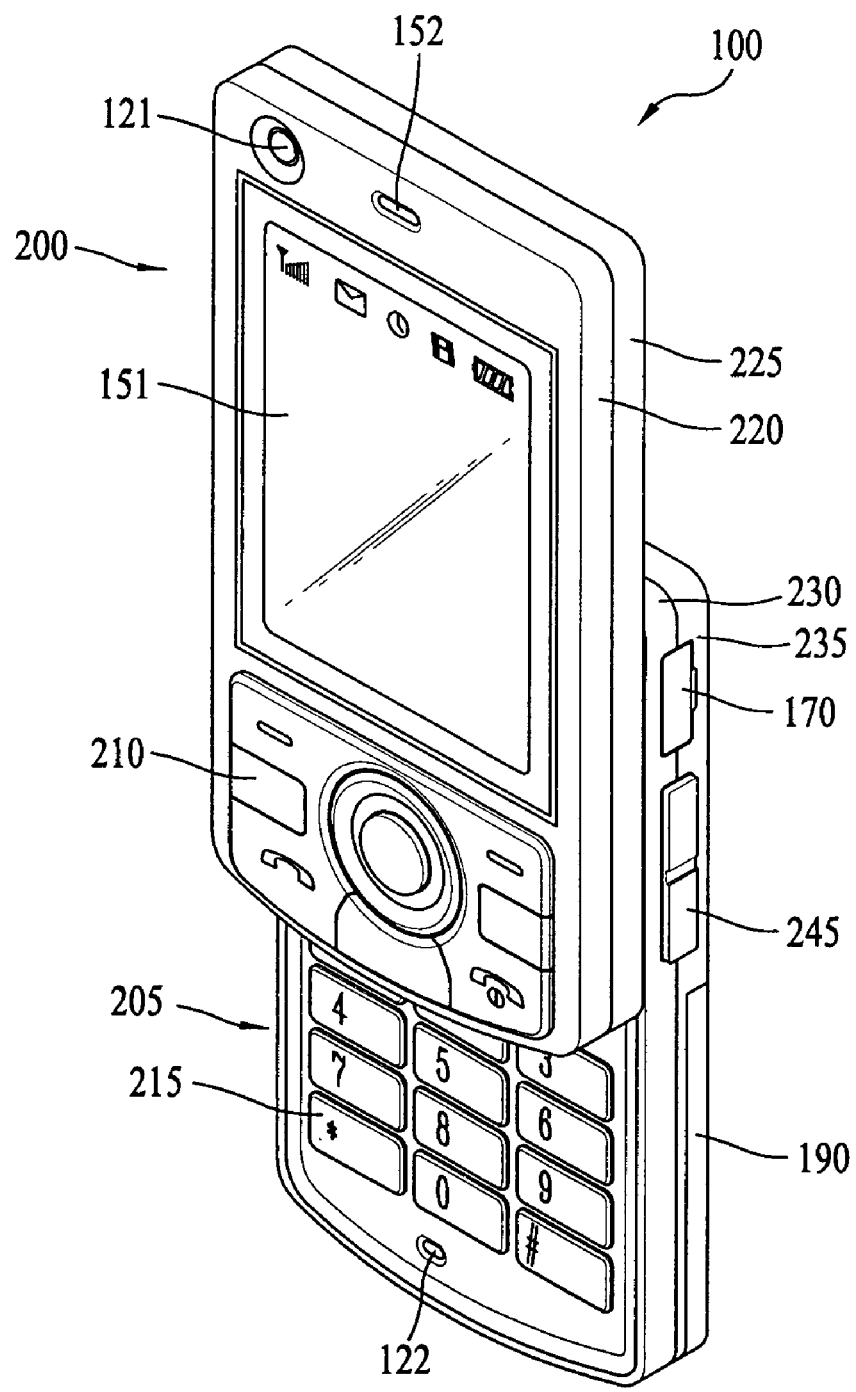
FIG. 2 is a perspective view of a front side of a communication terminal according to an embodiment of the present invention.

FIG. 2 is a perspective view of a front side of a communication terminal according to an embodiment of the present invention. In FIG. 2, the communication terminal 100 is shown having a first body 200 configured to slideably cooperate with a second body 205. The user input unit (described in FIG. 1) is implemented using function keys 210 and keypad 215. The function keys 210 are associated with first body 200, and the keypad 215 is associated with second body 205. The keypad includes various keys (e.g., numbers, characters, and symbols) to enable a user to place a call, prepare a text or multimedia message, and otherwise operate the communication terminal.

The first body 200 slides relative to second body 205 between open and closed positions. In a closed position, the first body is positioned over the second body in such a manner that the keypad 215 is substantially or completely obscured by the first body 200. In the open position, user access to the keypad 215, as well as the display 151 and function keys 210, is possible. The function keys are convenient to a user for entering commands such as start, stop and scroll.

The communication terminal 100 is operable in either a standby mode (e.g., able to receive a call or message, receive and respond to network control signaling), or an active call mode. Typically, the communication terminal 100 functions in a standby mode when in the closed position, and an active mode when in the open position. This mode configuration may be changed as required or desired.

The first body 200 is shown formed from a first case 220 and a second case 225, and the second body 205 is shown formed from a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200, 205. The first and second bodies 200, 205 are typically sized to receive electronic components necessary to support operation of the communication terminal 100.

The first body 200 is shown having a camera 121 and audio output unit 152, which is configured as a speaker, positioned relative to the display 151. If desired, the camera 121 may be constructed in such a manner that it can be selectively positioned (e.g., rotated, swiveled, etc.) relative to first body 200.

The function keys 210 are positioned adjacent to a lower side of the display 151. The display 151 is shown implemented as an LCD or OLED. Recall that the display may also be configured as a touchscreen having an underlying touchpad which generates signals responsive to user contact (e.g., finger, stylus, etc.) with the touchscreen.

Second body 205 is shown having a microphone 122 positioned adjacent to keypad 215, and side keys 245, which are one type of a user input unit, positioned along the side of second body 205. Preferably, the side keys 245 may be configured as hot keys, such that the side keys are associated with a particular function of the communication terminal. An interface unit 170 is shown positioned adjacent to the side keys 245, and a power supply 190 in a form of a battery is located on a lower portion of the second body 205.

Figure 3:
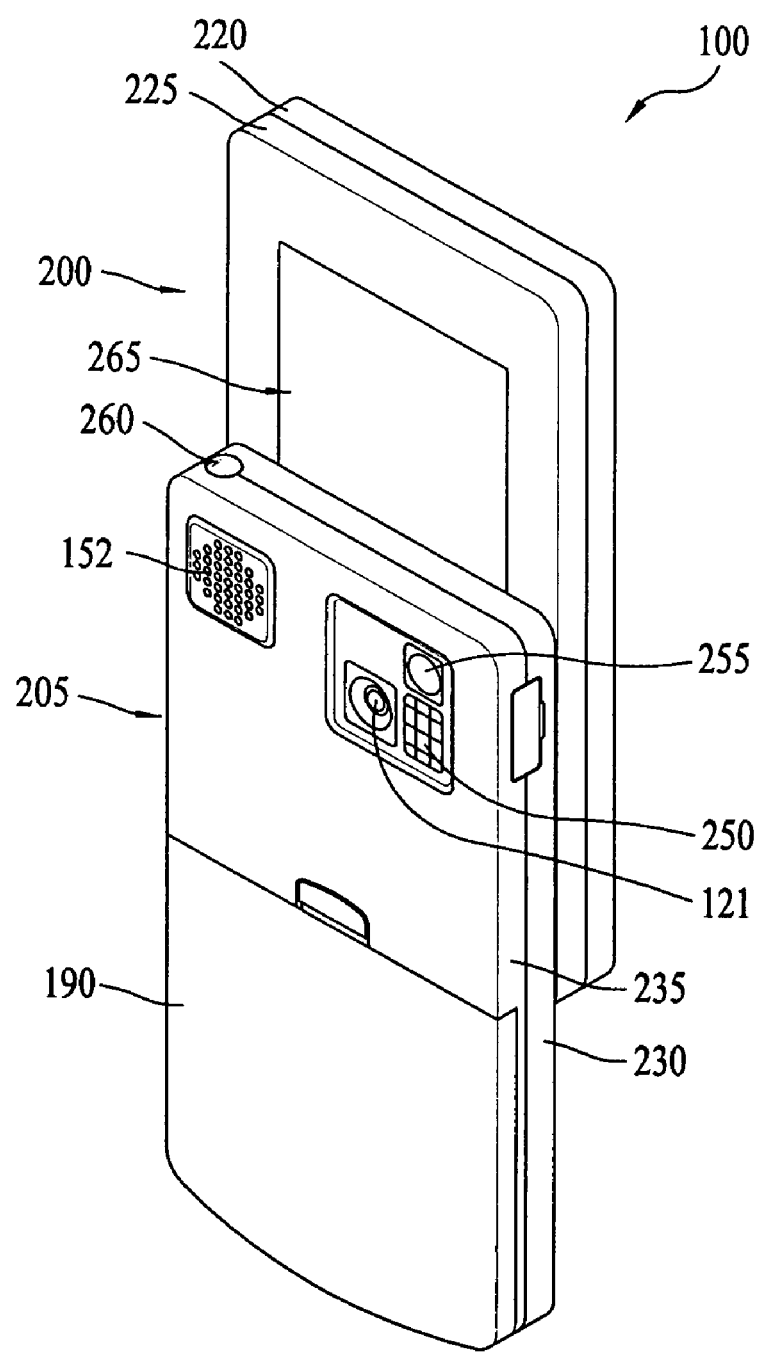
FIG. 3 is a rear view of the communication terminal shown in FIG. 2.

FIG. 3 is a rear view of the communication terminal shown in FIG. 2. FIG. 3 shows the second body 205 having a camera 121, and an associated flash 250 and mirror 255. The flash operates in conjunction with the camera 121 of the second body. The mirror 255 is useful for assisting a user to position camera 121 in a self-portrait mode. The camera 121 of the second body faces a direction which is opposite to a direction faced by camera 121 of the first body 200 (FIG. 2). Each of the cameras 121 of the first and second bodies may have the same or different capabilities.

In an embodiment, the camera of the first body 200 operates with a relatively lower resolution than the camera of the second body 205. Such an arrangement works well during a video conference, for example, in which reverse link bandwidth capabilities may be limited. The relatively higher resolution of the camera of the second body 205 (FIG. 3) is useful for obtaining higher quality pictures for later use or for communicating to others.

The second body 205 also includes an audio output module 152 configured as a speaker, and which is located on an upper side of the second body. If desired, the audio output modules of the first and second bodies 200, 205, may cooperate to provide stereo output. Moreover, either or both of these audio output modules may be configured to operate as a speakerphone.

A broadcast signal receiving antenna 260 is shown located at an upper end of the second body 205. Antenna 260 functions in cooperation with the broadcast receiving module 111 (FIG. 1). If desired, the antenna 260 may be fixed or configured to retract into the second body 205. The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

The communication terminal 100 of FIGS. 1 to 3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
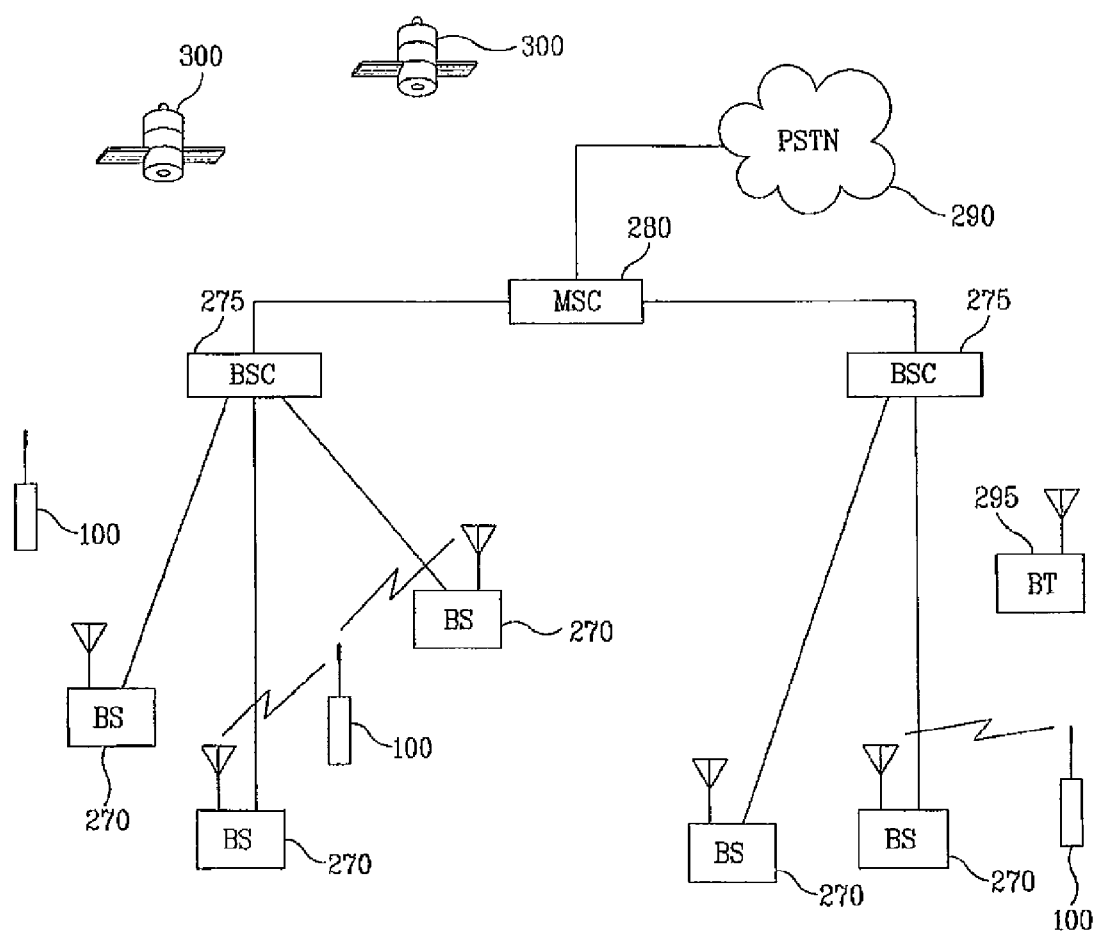
FIG. 4 is a block diagram of a CDMA wireless communication system operable with the communication terminal of FIGS. 1 to 3.

Referring now to FIG. 4, a CDMA wireless communication system is shown having a plurality of communication terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A broadcasting transmitter 295 is shown broadcasting to portable terminals 100 operating within the system. The broadcast receiving module 111 (FIG. 1) of the portable terminal is typically configured to receive broadcast signals transmitted by the broadcasting transmitter 295. Similar arrangements may be implemented for other types of broadcast and multicast signaling (as discussed above).

FIG. 4 further depicts several global positioning system (GPS) satellites 300. Such satellites facilitate locating the position of some or all of the portable terminals 100. Two satellites are depicted, but it is understood that useful positioning information may be obtained with greater or fewer satellites. The position-location module 115 (FIG. 1) of the portable terminal 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various communication terminals 100. The communication terminals 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the communication terminals 100.

Figure 5:
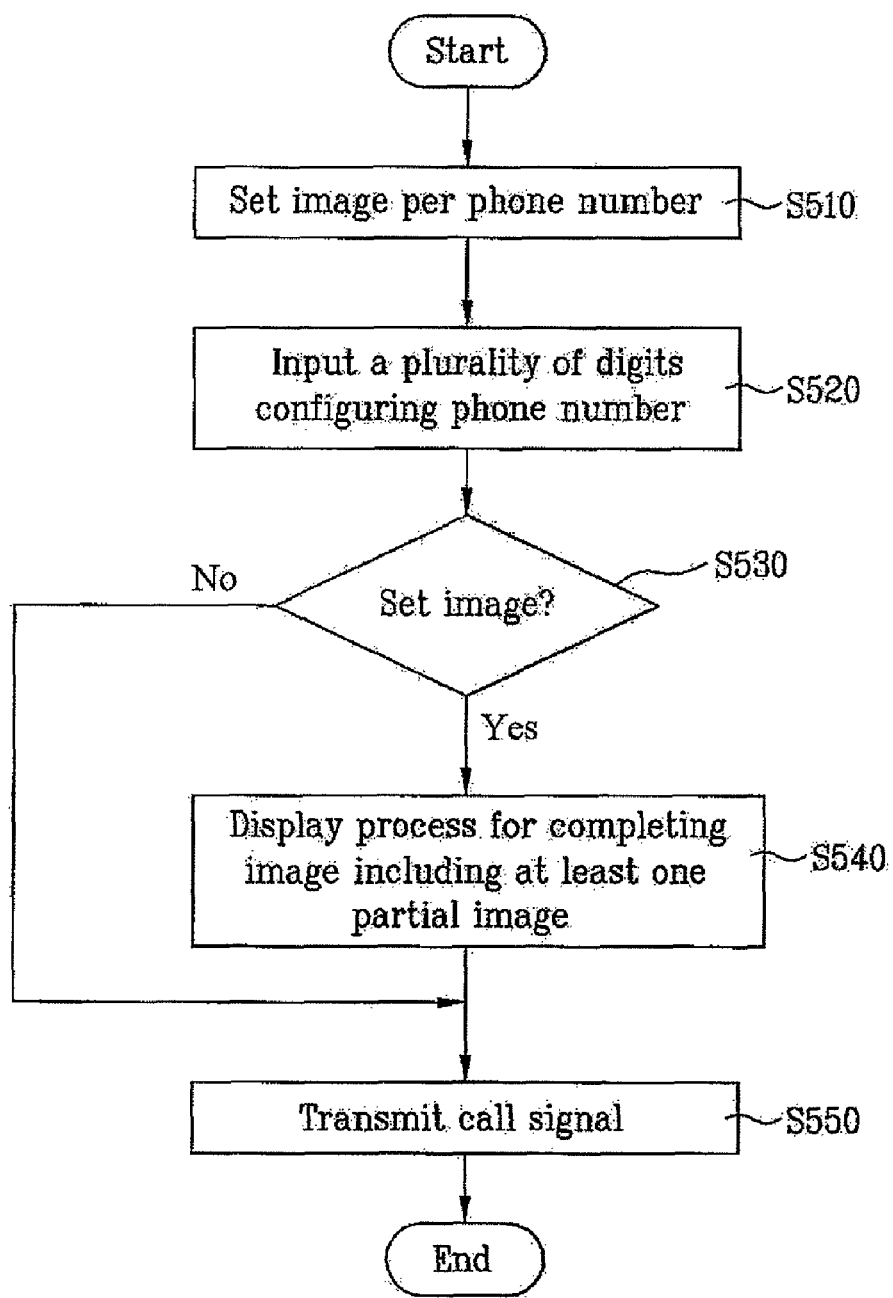
FIG. 5 is a flowchart of a displaying method in a communication terminal according to one embodiment of the present invention.

In the following description, steps of a displaying method in a communication terminal according to the present invention are explained with reference to FIG. 5. FIG. 5 is a flowchart of a displaying method in a communication terminal according to one embodiment of the present invention. For clarity and convenience of description, it is assumed that a communication terminal in FIG. S can include at least one of the elements shown in FIG. 1.

Referring to FIG. 5, the communication terminal 100 sets at least one image for each phone number by user's manipulation via the user input unit 130 [S510].

In this case, the image is received from an external environment via the wireless communication unit 110, inputted via the camera 121, transferred from an external medium connected via the sensing unit 140 or stored in the memory 160 in advance. It is understood that the image inputted via the wireless communication unit 110, the camera 121 or the sensing unit 150 can be stored in the memory 160.

The communication terminal 100 can store at least one image, at least one phone number and an image set for the at least one phone number in the memory 160. So, the communication terminal 100 is able to set at least one image for each of the at least one or more phone numbers stored in the memory 160 in accordance with a selection made by a user.

In the setting step S510, the communication terminal 100 is able to set an image per a phone number and is also able to set an image for each group constructed with at least one or more phone numbers. In this case, a same image can be set for a plurality of phone numbers or a plurality of groups. Optionally, in the setting step S510, the communication terminal 100 is able to set at least one image, which will be displayed in case of inputting a phone number for sending a call signal, regardless of a phone number in accordance with a selection made by a user. In this case, the communication terminal 100 is able to set an image to display, a partition count (explained later), a display sequence for a plurality of images and the like in accordance with a selection made by a user.

Optionally, in the setting step S510, in case that a phone number and a folder (e.g., image folder) are set for a single name, the communication terminal 100 enables an image stored in the folder to be automatically set for a phone number for which a same name is set.

A plurality of digits configuring a prescribed phone number are inputted to the communication terminal 100 [S520].

In the inputting step S520, a user inputs a plurality of digits to the communication terminal 100 one by one via the user input unit 130 (hereinafter named 'first inputting method). In the inputting step S520, if a user selects an abbreviated number set for a phone number, a plurality of digits configuring a phone number corresponding to the selected abbreviated number are inputted to the communication terminal 100 (hereinafter named 'second inputting method). In the inputting step S520, a user inputs a plurality of digits, which configure a phone number selected from a phone number list (e.g., phonebook list, recent incoming/outgoing call list, etc.), to the communication terminal 100 (hereinafter named 'third inputting method').

In the first inputting method, if a plurality of digits configuring a phone number are sequentially inputted to the communication terminal 100 from its first digit, the communication terminal 100 is able to identify at least one phone number including the currently input-completed digits. For instance, in case that currently input-completed digits configure a number '019 234', the communication terminal 100 is able to identify '019-234-111', '019-234-1234', '019 -2345-2345', etc. In case that currently input-completed digits configure a number '019 234 2', the communication terminal 100 is able to identify '019-2345-2345'.

In the second inputting method, in case that a prescribed abbreviated number set for a phone number is selected, the communication terminal 100 is able to identify the phone number corresponding to the selected abbreviated number. For instance, if '019-123-4567' is set to an abbreviated number '1', the communication terminal 100 is able to identify '019-123-4567' if the abbreviated number '1' is selected via the user input unit 130. Generally, in case that a long-key is inputted, the communication terminal 100 is able to recognize it as a key selection for an abbreviated number input.

In the third inputting method, in case that a prescribed phone number is selected from a phone number list, the communication terminal 100 is able to identify the selected phone number. For instance, if '019-111-1111' is selected from a phonebook list, the communication terminal 100 is able to directly identify '019-111-1111'.

The communication terminal 100 identifies a phone number including a plurality of digits inputted in the inputting step S520 and then decides whether an image is set for the identified phone number [S530]. The image may be an image specifically assigned to the identified phone number. Alternatively, the image may be a default image.

Of course, if an image is not set per a phone number or group, the phone number identifying process in the inputting step S520 and the process for deciding a presence or non-presence of the phone number image setting may not be necessary. In this case, in the deciding step S530, it is able to decide whether an image display function using a partial image is set in inputting a plurality of digits configuring a phone number.

As a result of the decision, if the image is set, when a plurality of digits are inputted to the communication terminal 100, the communication terminal 100 displays an image constructed from at least one partial image on the display 151 [S540].

In case that digits are inputted by the first inputting method, prior to an execution of the displaying step S540, the communication terminal 100 is able to partition an image set for an identified phone number to have partial images amounting to a count of the rest of digits except a plurality of inputted digits among total digits configuring the identified phone number. And, the displaying step can be executed if a first one of the rest of the digits is inputted.

For this, the displaying step S540 will be explained in detail with reference to FIGS. 6A to 6G.

FIGS. 6A to 6G are first state diagrams of a screen to explain an image displaying method in accordance with digit inputs to configure a phone number in a communication terminal according to one embodiment of the present invention.

Figure 6A:
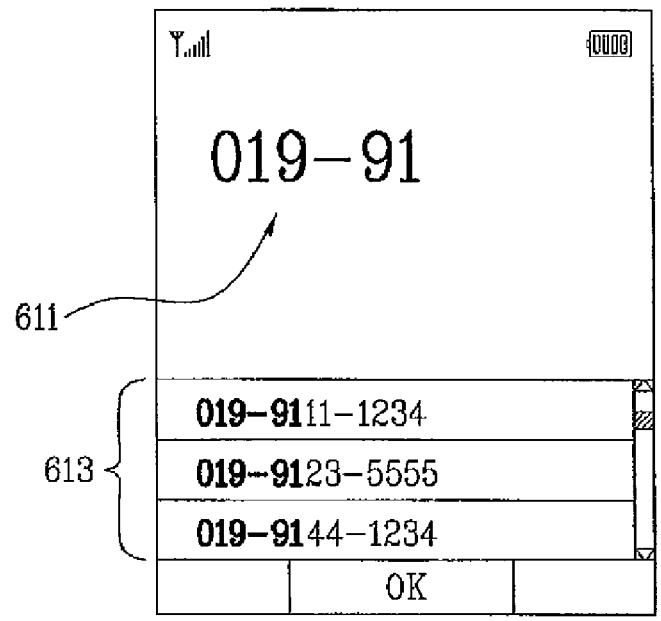
FIGS. 6A to 6G are first state diagrams of a screen to explain an image displaying method in accordance with digit inputs to configure a phone number in a communication terminal according to one embodiment of the present invention.
Figure 6B:
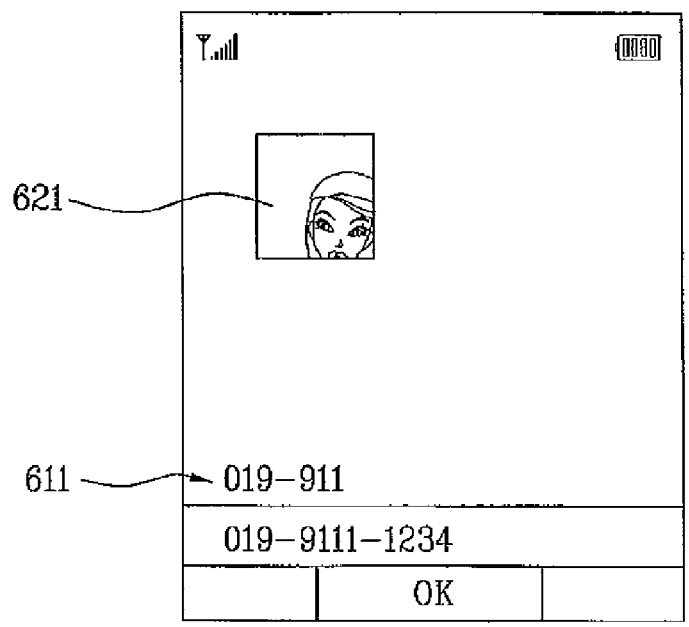
Figure 6C:
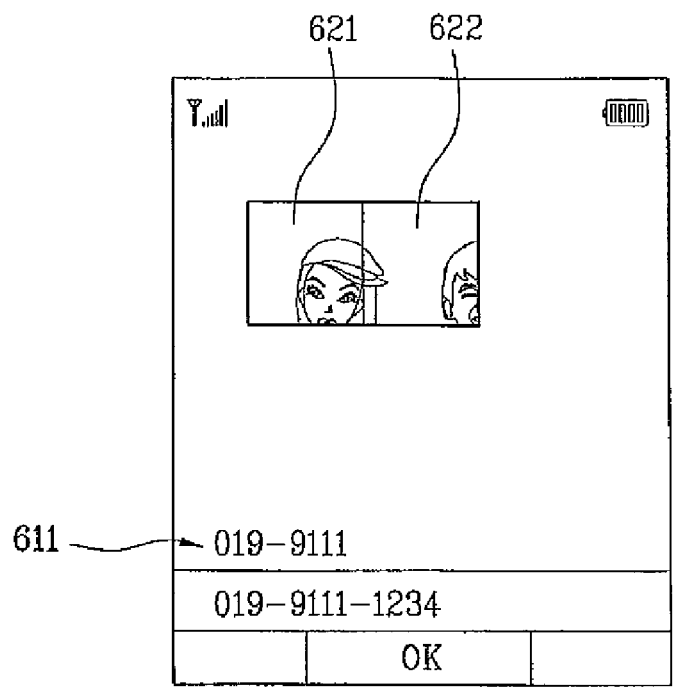
Figure 6D:
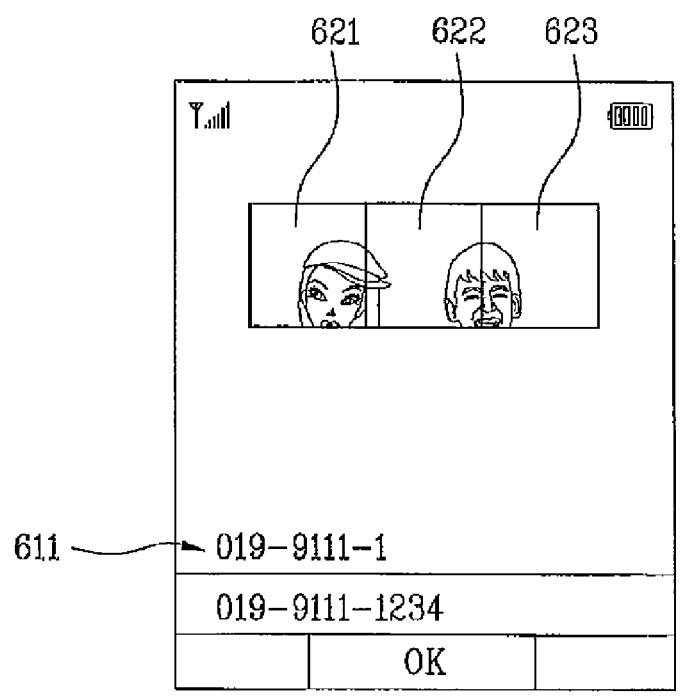
Figure 6E:
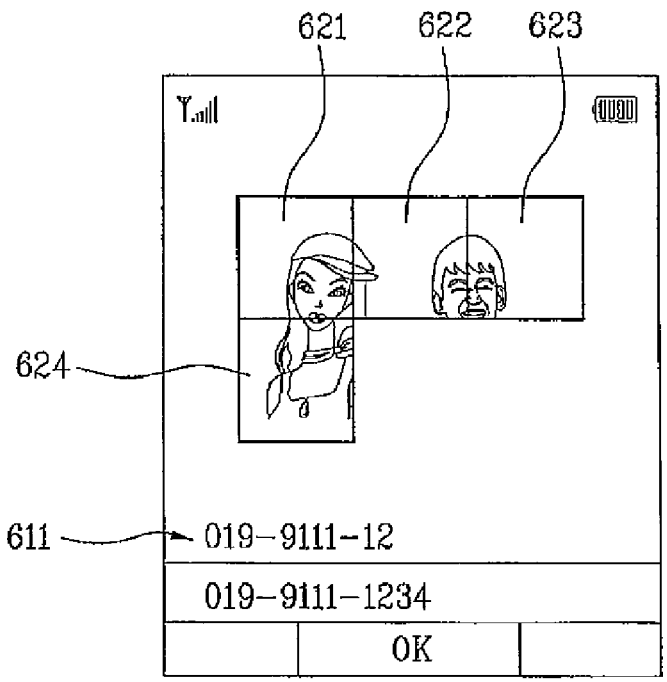
Figure 6F:
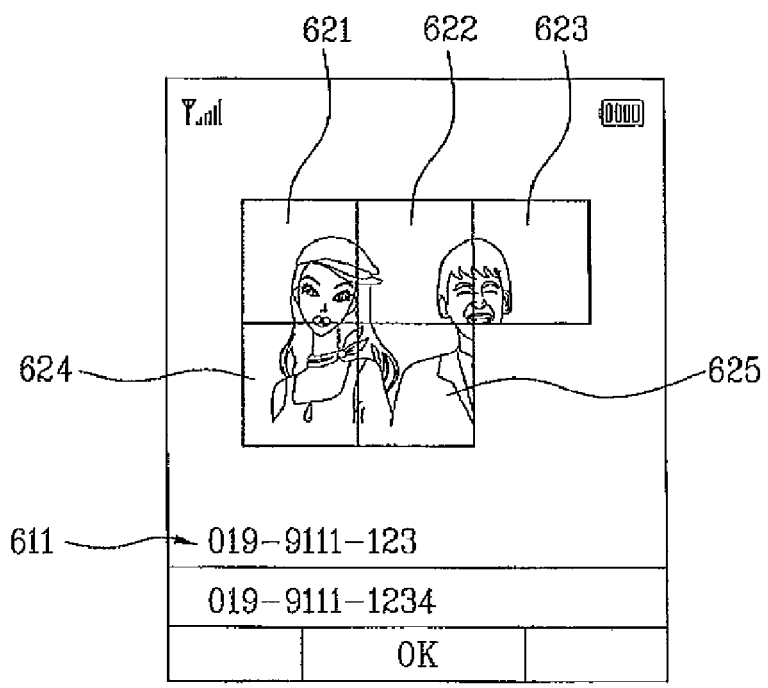
Figure 6G:
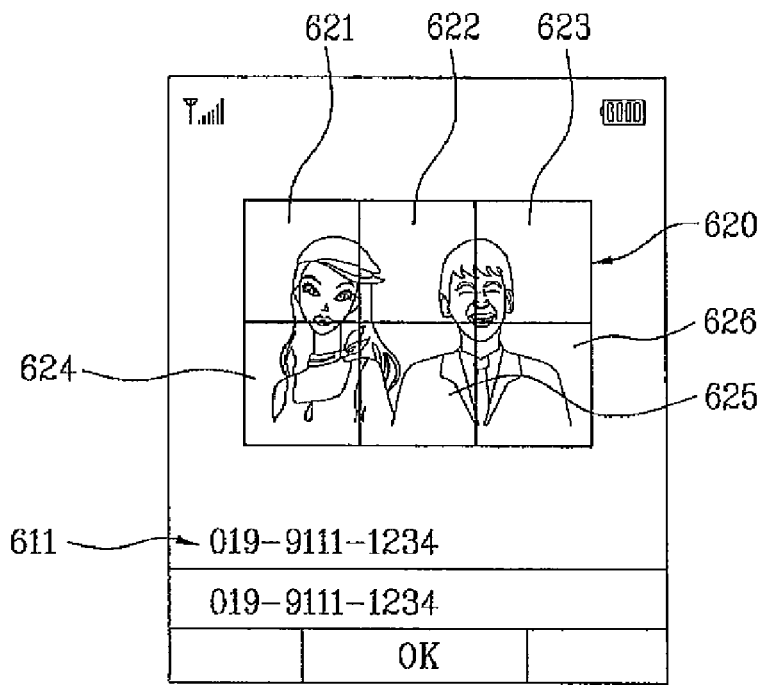

First of all, in case that '019 91' is inputted to the communication terminal 100, the communication terminal 100 displays a list 613 constructed with phone numbers including '019 911' [FIG. 6A].

If '1' is further inputted, '019 911' has been inputted to the communication terminal 100 so far. If there exists a single phone number '019-9111-1234' including '019 911', the communication terminal 100 recognizes that a count of the rest digits excluding currently input-completed digits '019 911' among total digits configuring '019-9111-1234' is 5 and is then able to partition an image set for '019-9111-1234' into six parts. Subsequently, the communication terminal 100 displays a partial image 621 corresponding to a first digit '1' among the rest digits [FIG. 6B].

If '1', '1', '2', '3' and '4' among the rest digits are sequentially inputted, the communication terminal 100 sequentially displays partial images 622, 623, 624, 625 and 626 respectively corresponding to '1', '1', '2', '3' and '4'. Thus, the communication terminal 100 displays an image 620 constructed with the partial images [FIGS. 6C to 6G].

The image revealed in FIGS. 6B-6F may be a default image set by the user or manufacturer. Upon completion of a phone number, the partial images may be replaced (dissolved, flipped, wiped, etc.) with an image stored locally and uniquely associated with the phone number. Alternatively, if the image revealed in FIGS. 6B-6F corresponds to an image stored locally and uniquely associated with the phone number, but a number of the sequence differs from the expected number (i.e., if the last digit input is not a '4' but is a '5'), the partial images revealed in FIGS. 6B-6F may be replaced with a default image. Similarly, if multiple stored numbers correspond to an input sequence, and each stored number is associated with a unique image, a default image may be revealed until only one stored number remains a viable candidate. At this time, the default image may be replaced by the image that corresponds to the candidate number.

Also, the controller may be configured to automatically select one phone number from the list of candidate phone numbers and complete the image based upon a predetermined criteria. The predetermined criteria may be one of a next digit, a call history parameter, or a user definition (e.g., a default image).

Also, the controller may be configured to set a count of partial images that comprise the image and to partition the image in accordance with the count In case that digits are inputted by the second or third inputting method, prior to an execution of the displaying step S540, the communication terminal 100 is able to partition an image set for an identified phone number to provide partial images to a plurality of digits configuring the identified phone number, respectively. And, the displaying step S540 can be executed based on the arrangement sequence of a plurality of the digits configuring the identified phone number.

For this, the displaying step S540 will be explained in detail with reference to FIGS. 7A to 7J as follows.

FIGS. 7A to 7J are second state diagrams of a screen to explain an image displaying method in accordance with digit inputs to configure a phone number in a communication terminal according to one embodiment of the present invention.

Figure 7A:
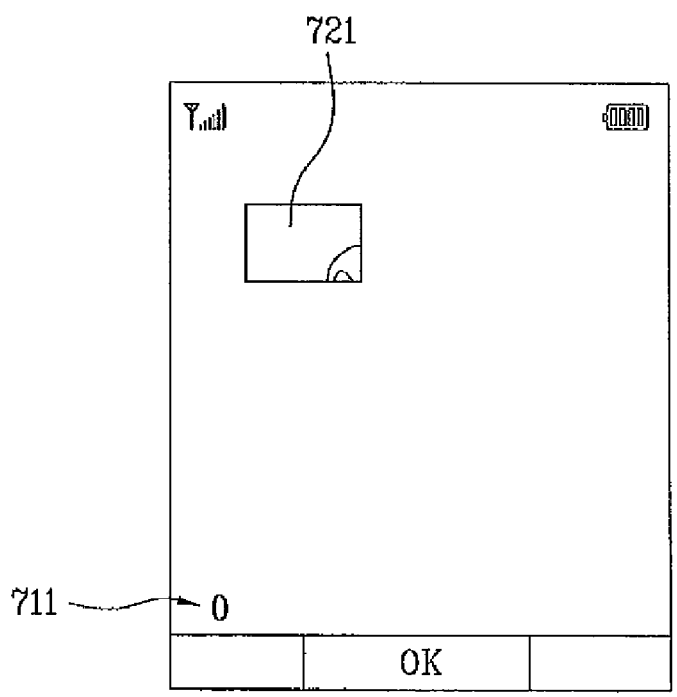
FIGS. 7A to 7J are second state diagrams of a screen to explain an image displaying method in accordance with digit inputs to configure a phone number in a communication terminal according to one embodiment of the present invention.
Figure 7B:
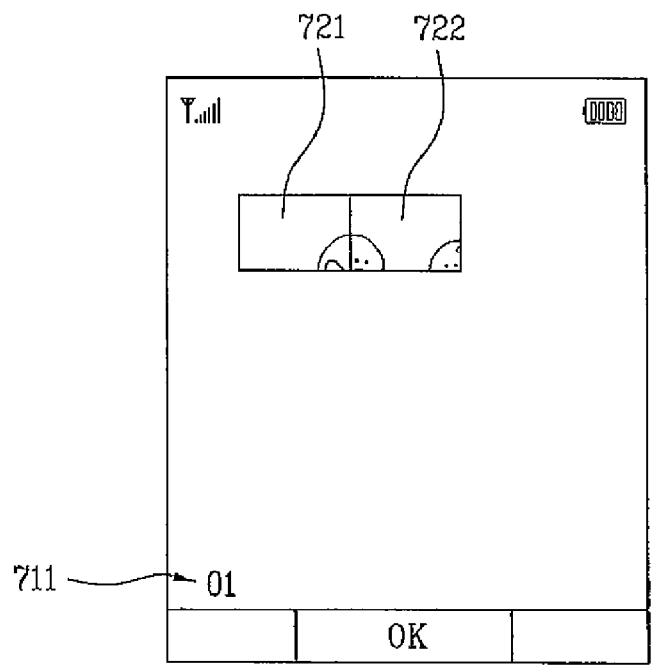
Figure 7C:
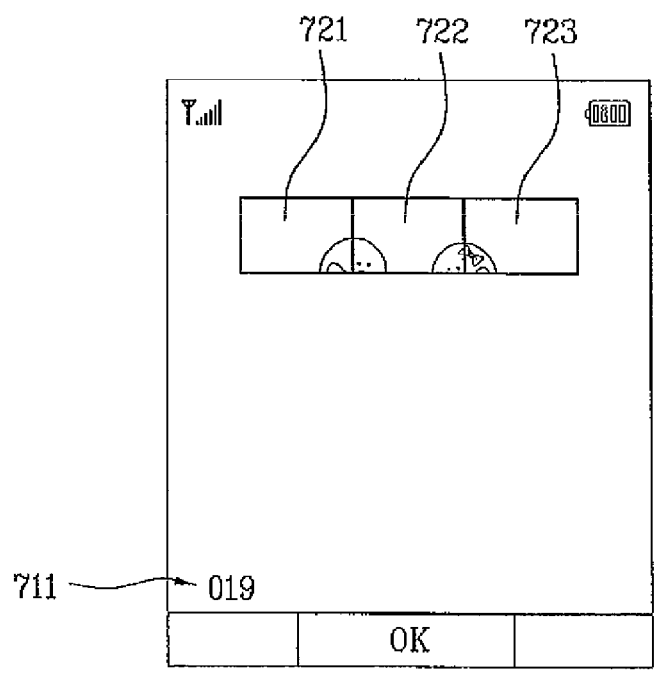
Figure 7D:
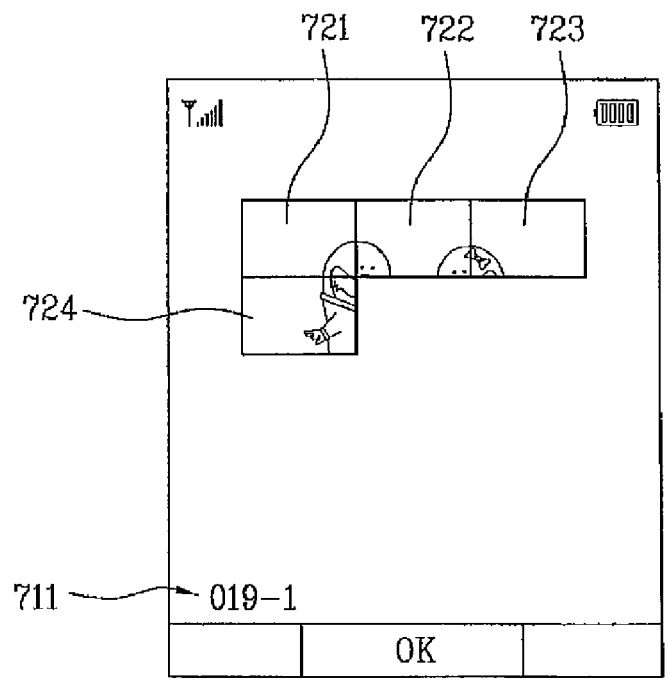
Figure 7E:
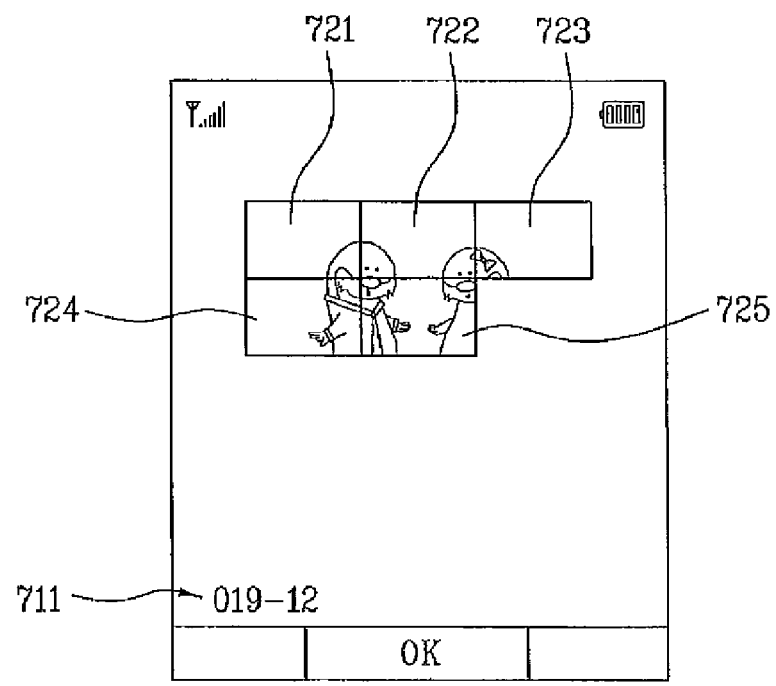
Figure 7F:
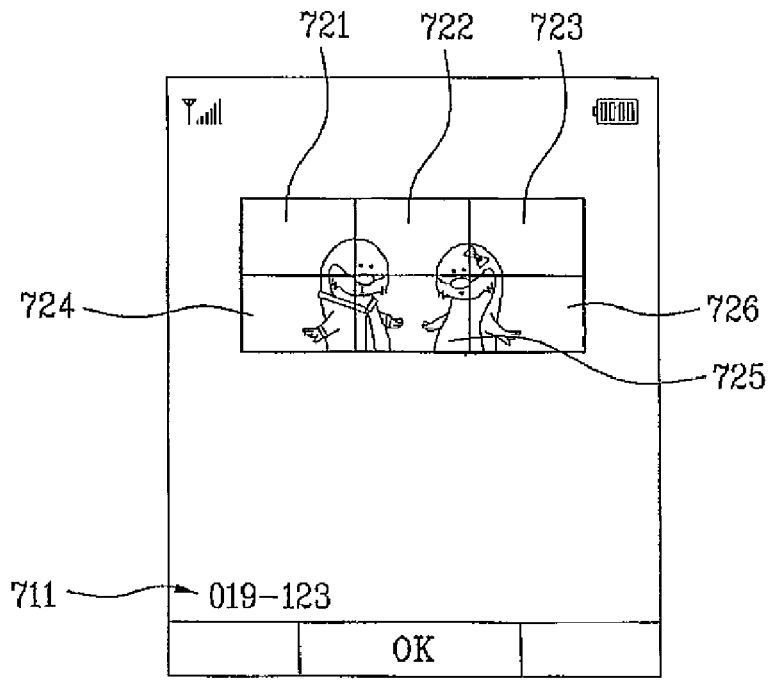
Figure 7G:
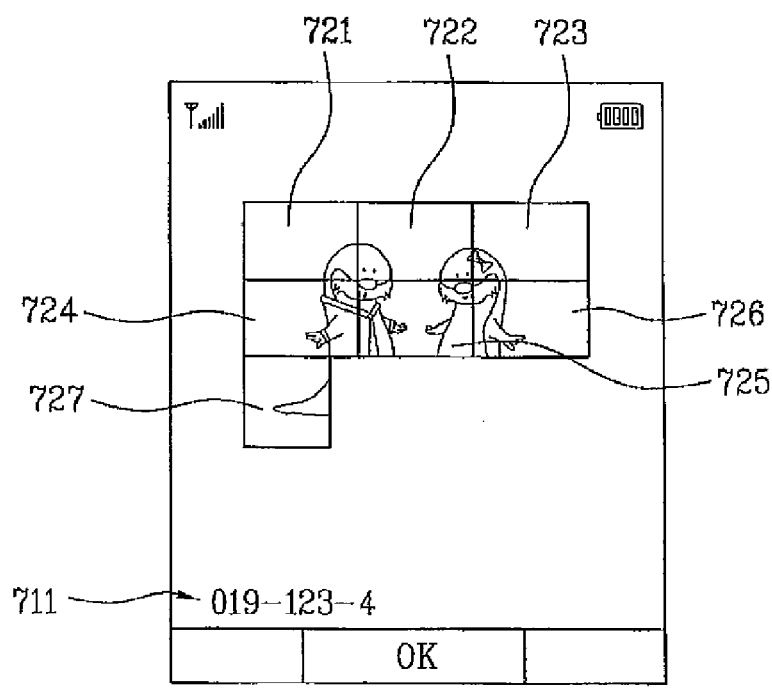
Figure 7H:
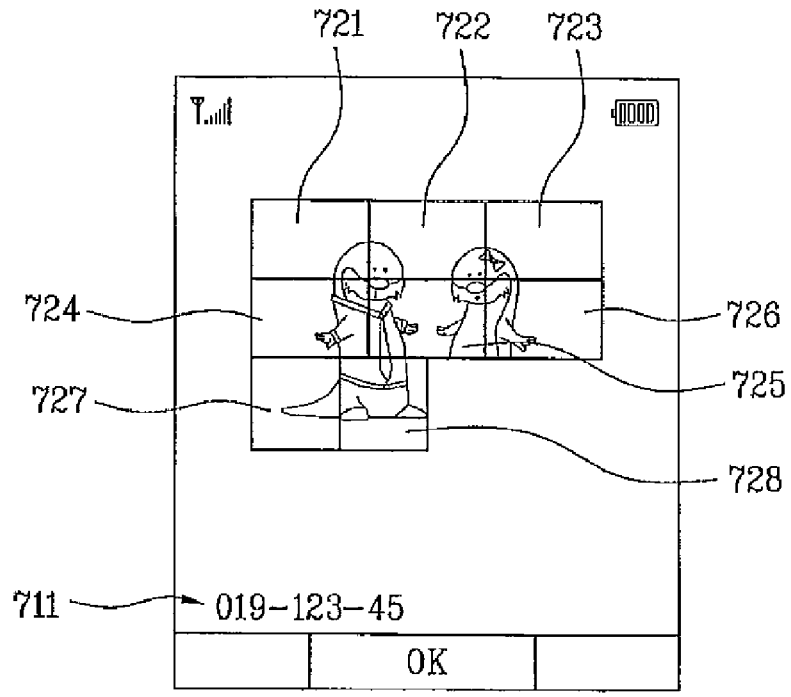
Figure 7I:
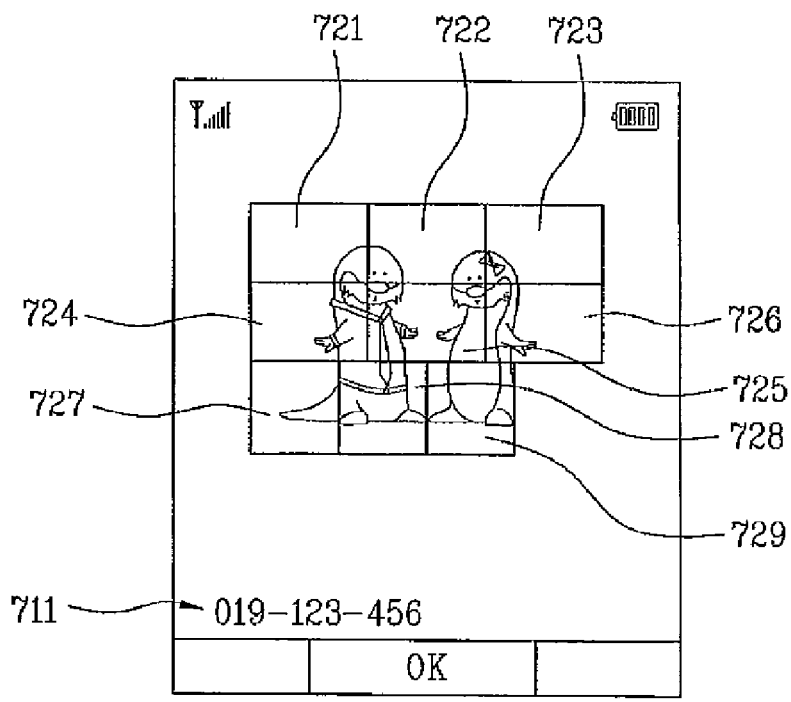
Figure 7J:
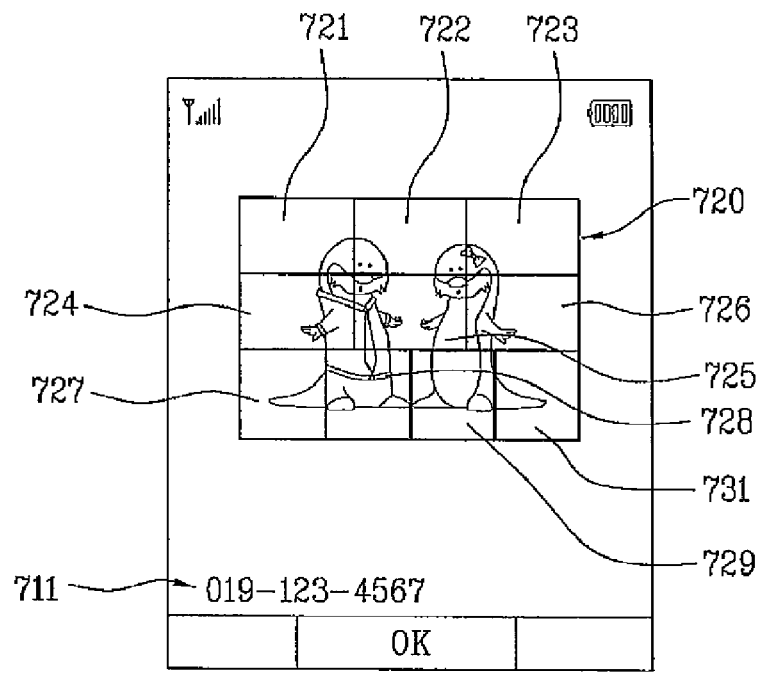

First of all, the communication terminal 100 displays a first digit '0' among a plurality of inputted digits and also displays a partial image 721 corresponding to the '0' [FIG. 7A].

As '1', '9', '1', '2', '3', '4', '5', '6' and '7' of the rest digits configuring a phone number are further inputted in sequence, the communication terminal 100 sequentially displays partial images 722, 723, 724, 725, 726, 727, 728, 729 and 731 corresponding to '1', '9', '1', '2', '3', '4', '5', '6' and '7', respectively. Thus, the communication terminal 100 displays an image 720 constructed with the partial images [FIGS. 7B to 7J].

Optionally, in displaying a phone number constructed with a plurality of inputted digits, as shown in FIG. 7A, it is able to sequentially display partial images corresponding to the digits based on an arrangement sequence of a plurality of the digits [not shown in the drawings].

Meanwhile, the communication terminal 100 is able to set a count of partial images in the setting step S510. A user arbitrarily sets the partial image count regardless of digits configuring a phone number. So, even if it is difficult to identify a phone number or even if it takes a considerable time to identify a phone number, a user can be provided with an image displaying process using partial images. Prior to an execution of the displaying step S540, the communication terminal 100 is able to partition an image, which is set to be displayed in case of a phone number input, into a plurality of partial images in accordance with the partial image count.

For this, the displaying step S540 will be explained in detail with reference to FIGS. 8A to 8F as follows.

FIGS. BA to 8F are third state diagrams of a screen to explain an image displaying method in accordance with digit inputs to configure a phone number in a communication terminal according to one embodiment of the present invention.

First of all, in case that a count of partial images is '4', as '0', '1', '9' and '1' included in a phone number are sequentially inputted, the communication terminal 100 sequentially displays four partial images corresponding to input operations of the '0', '1', '9' and '1'. Thus, the communication terminal 100 displays an image constructed with the four partial images [FIGS. 8A to 8D].

Figure 8A:
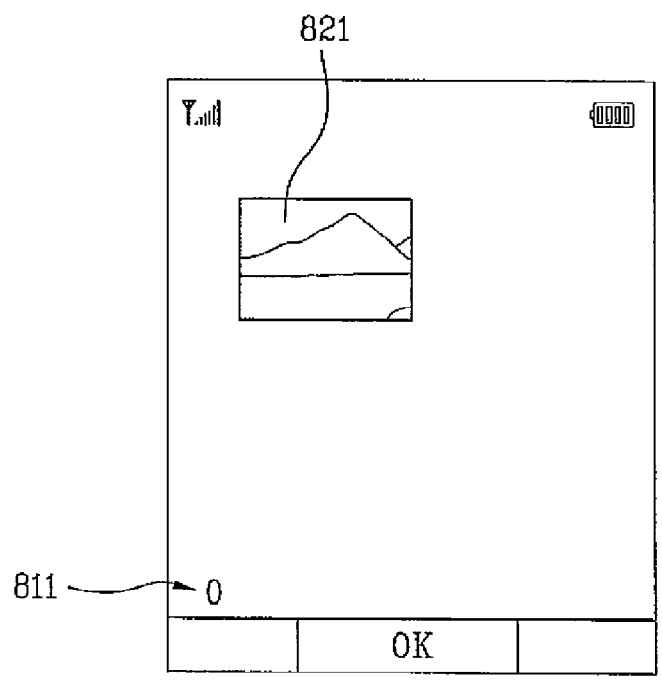
FIGS. 8A to 8F are third state diagrams of a screen to explain an image displaying method in accordance with digit inputs to configure a phone number in a communication terminal according to one embodiment of the present invention.
Figure 8B:
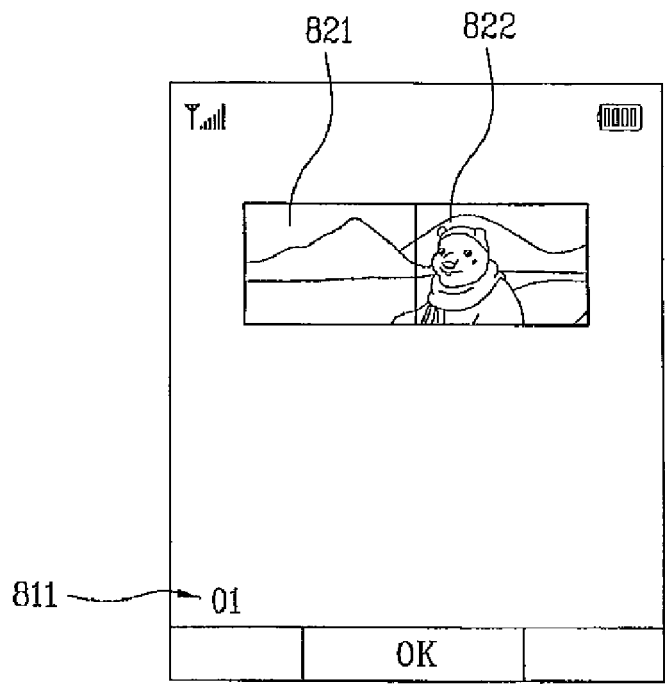
Figure 8C:
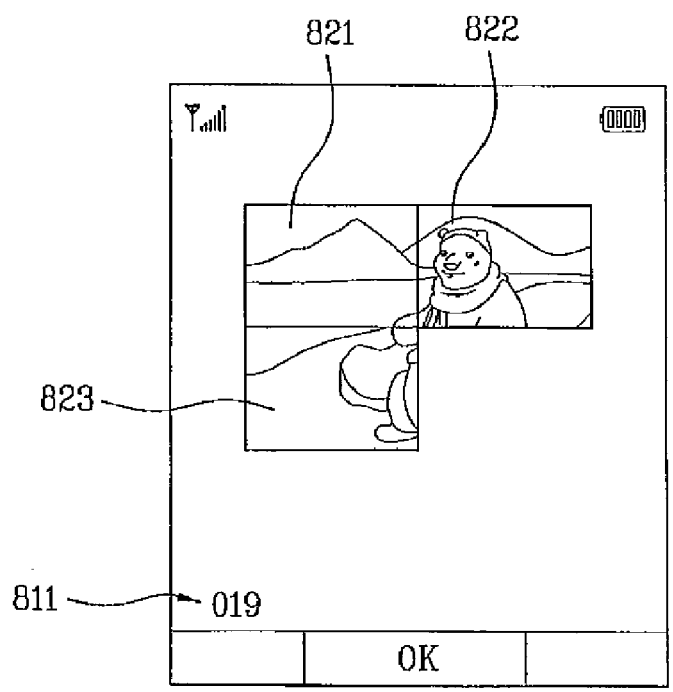
Figure 8D:
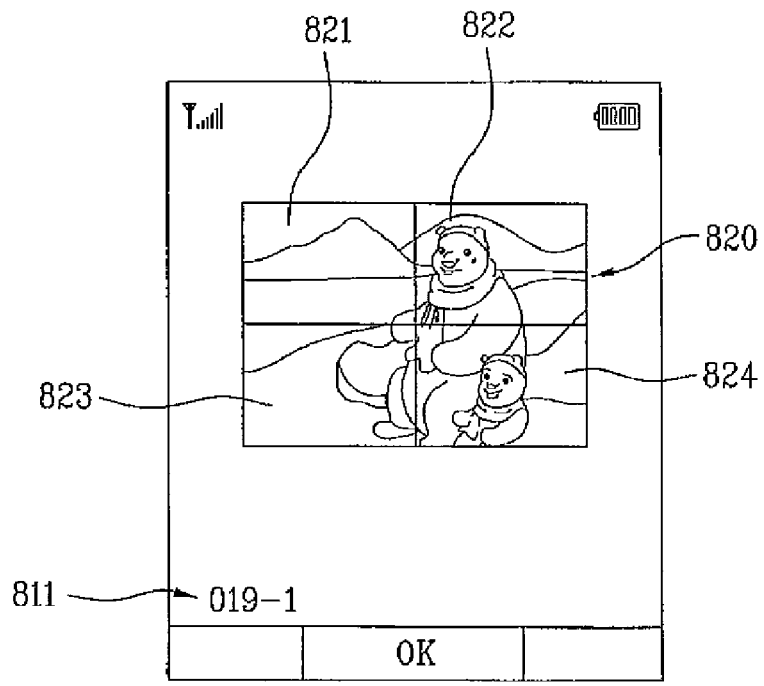
Figure 8E:
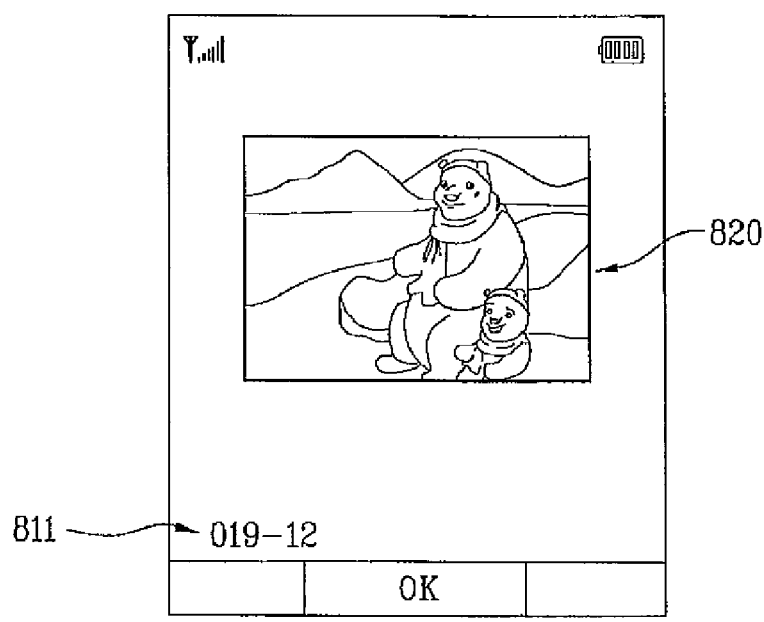
Figure 8F:
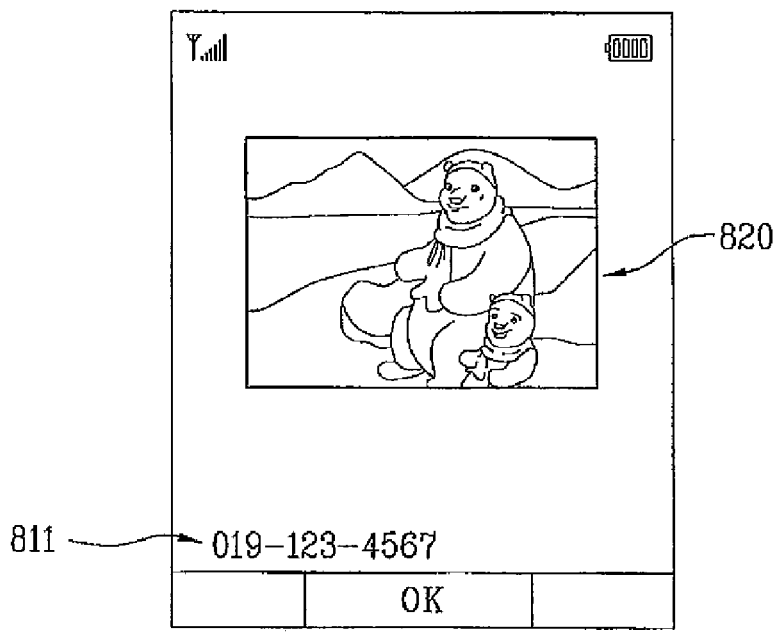

Because the communication terminal 100 has displayed the entire image using the partial images, if there are inputs of the rest of digits configuring the phone number later, the communication terminal 100 is able to keep displaying the completed image [FIG. 8E and FIG. 8F].

Optionally, regardless of a digit input timing point, the communication terminal 100 is able to sequentially display partial image with a predetermined time interval while a digit inputting operation exists [not shown in the drawing]. After the communication terminal 100 has displayed the complete image, if the rest of digits are inputted, the communication terminal 100 may repeatedly complete the image.

Referring to FIG. 5 again, the communication terminal 100 transmits a call signal to a terminal corresponding to the phone number constructed with a plurality of the digits inputted in the inputting step S520 [S550]. In particular, the communication terminal 100 is able to execute the transmitting step S550 via the mobile communication module 112.

In this case, the call signal may include an audio call signal and a video call signal.

Furthermore, in the transmitting step S550, it is able to transmit at least one selected from the group consisting of a message signal, an e-mail signal and a website access signal. In this case, the communication terminal 100 can enter a mode for writing a message to be transmitted to a terminal corresponding to a phone number prior to the transmitting step S550, enter a mode for writing an e-mail to be sent to an e-mail address stored fro a name set for a phone number prior to the transmitting step S550, or access a website using a website address stored for a name set for a phone number.

Generally, after whole digits configuring a phone number have been inputted, if a user selects a 'send' key, the communication terminal 100 is able to transmit a call signal.

The communication terminal 100 is able to transmit a call signal without a separate user's manipulation as soon as digits configuring a phone number are completely inputted.

In case that the communication terminal 100 includes a touchscreen, if the completed image is touched, the communication terminal 100 is able to transmit a call signal to a terminal corresponding to a phone number for which the completed image has been set.

Figure 9A:
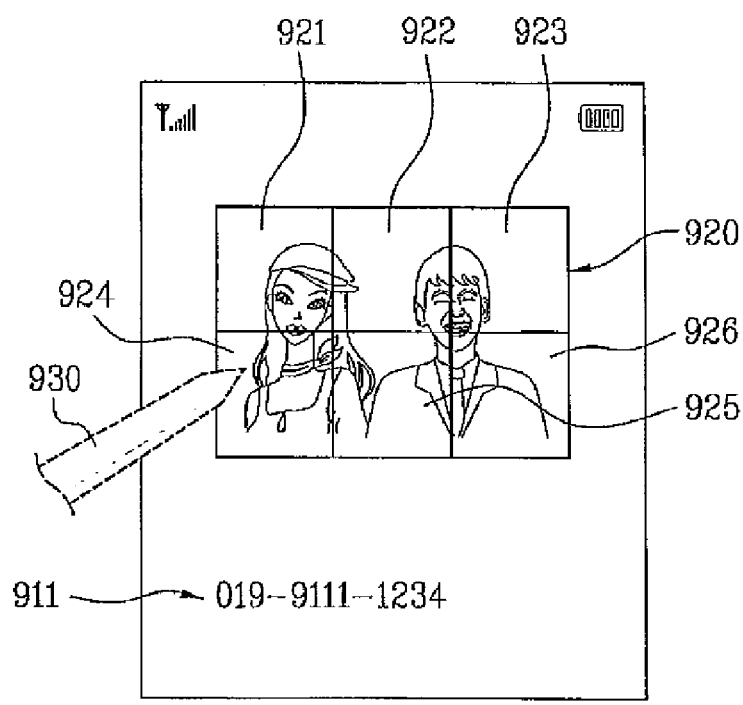
FIG. 9A and FIG. 9B are state diagrams of a screen to explain a process for transmitting a call signal in a communication terminal according to one embodiment of the present invention.
Figure 9B:
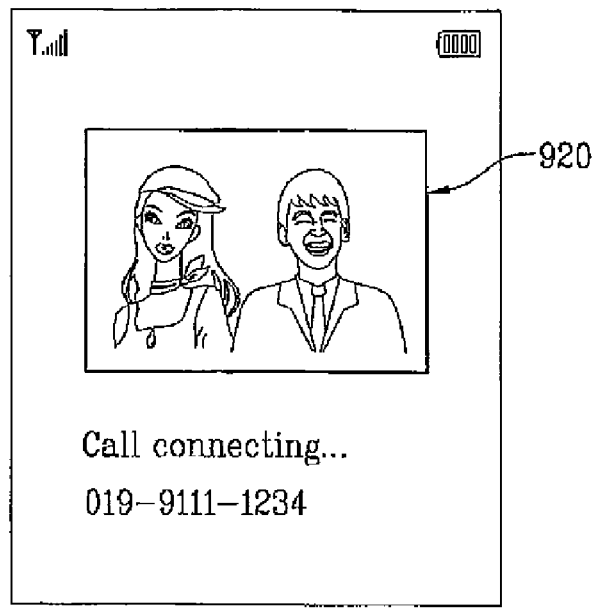

For instance, referring to FIG. 9A and FIG. 9B, if a prescribed point of a completed image 920 is touched, the communication terminal 100 is able to transmit a call signal to a phone number '019-9111-1234' for which the completed image has been set.

Steps of a displaying method of communication terminal according to the present invention are explained with reference to FIG. 10 as follows.

Figure 10:
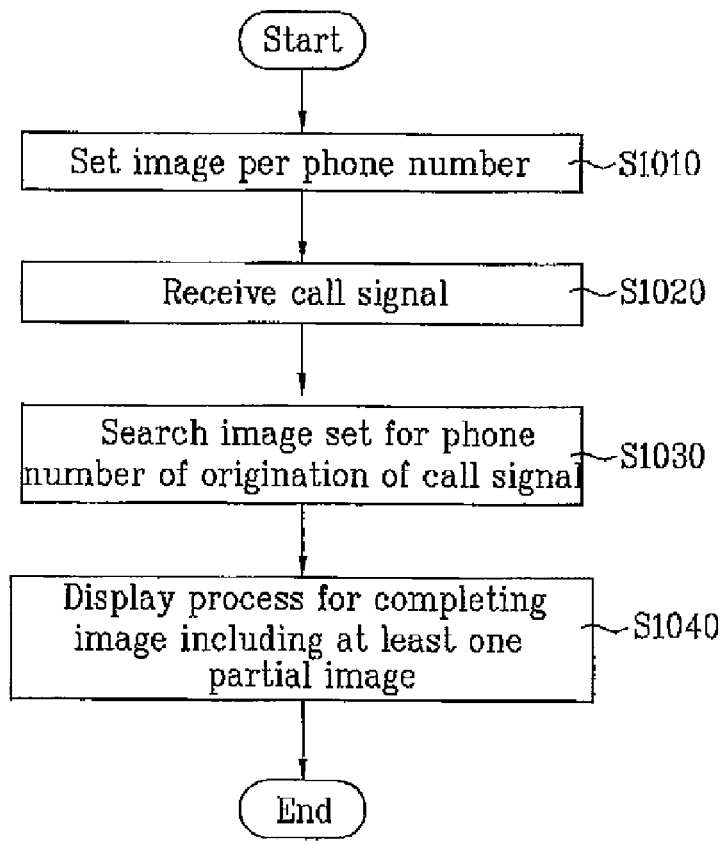
FIG. 10 is a flowchart of a displaying method in a communication terminal according to another embodiment of the present invention.
Figure 11A:
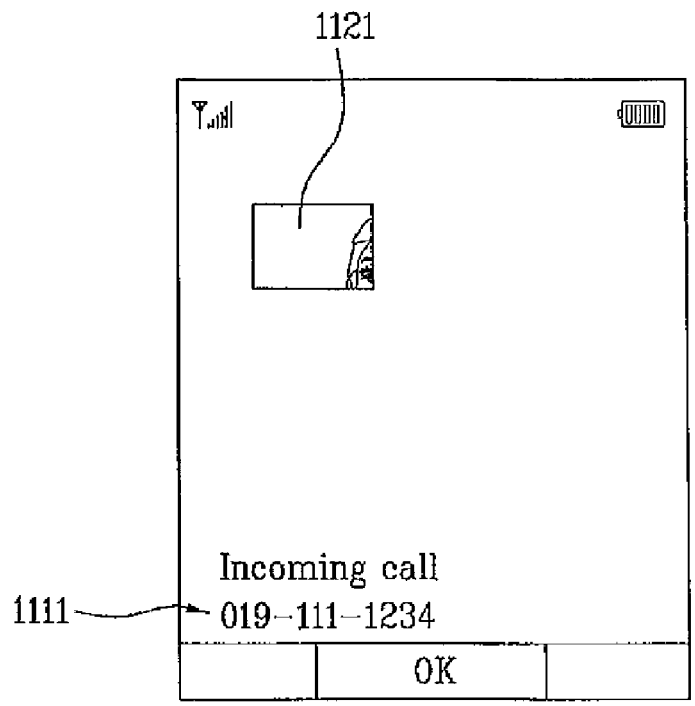
FIGS. 11A to 11J are first state diagrams of a screen to explain an image displaying method in accordance with a call signal reception in a communication terminal according to one embodiment of the present invention.
Figure 11B:
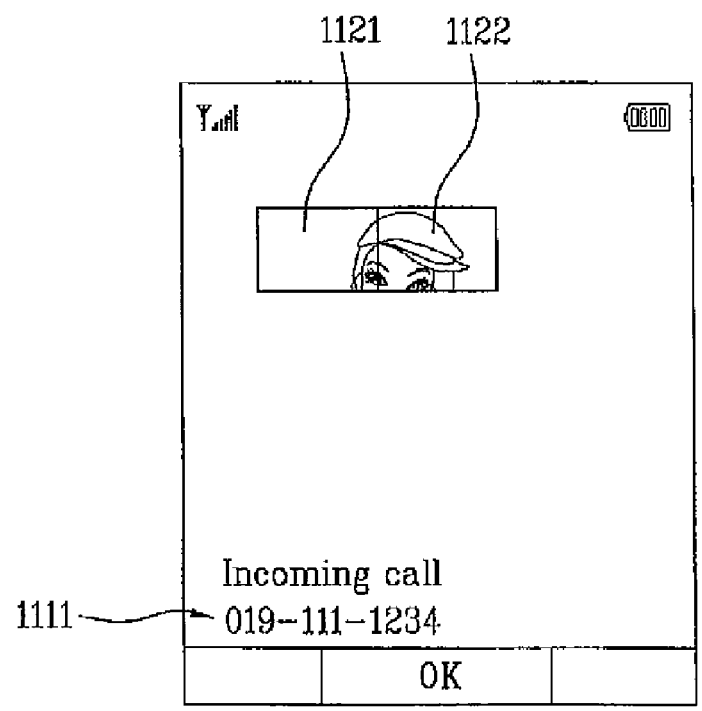
Figure 11C:
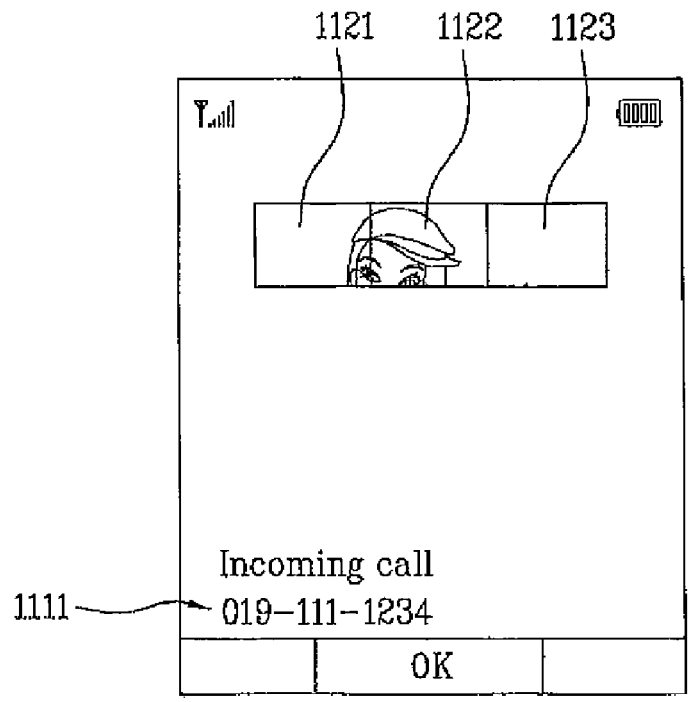
Figure 11D:
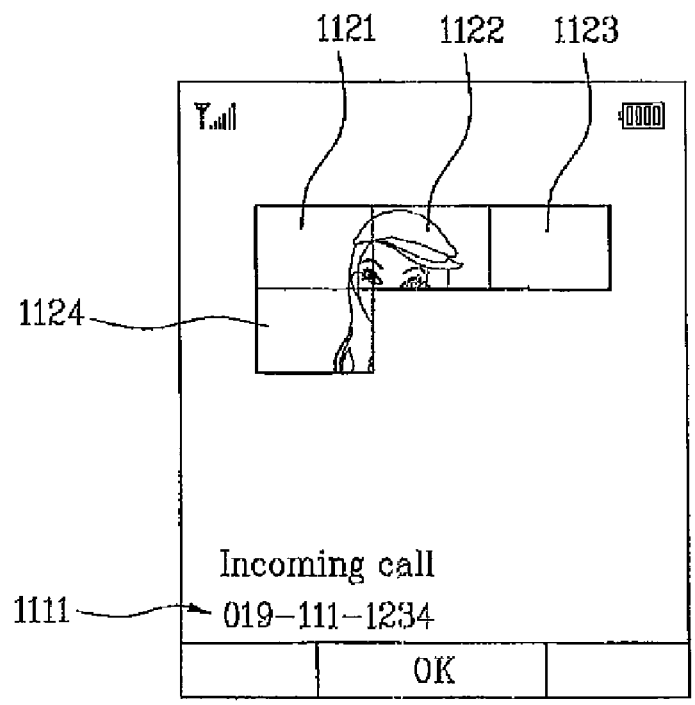
Figure 11E:
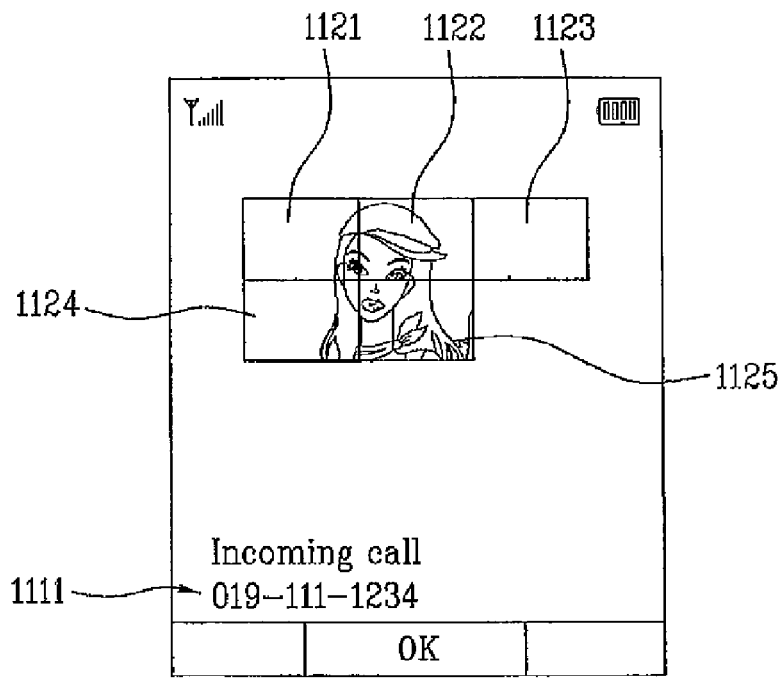
Figure 11F:
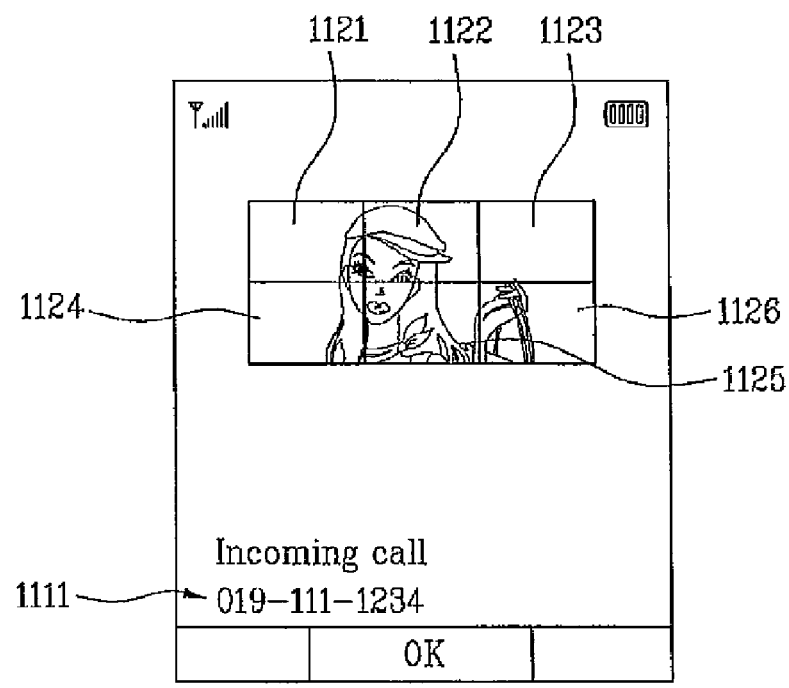
Figure 11G:
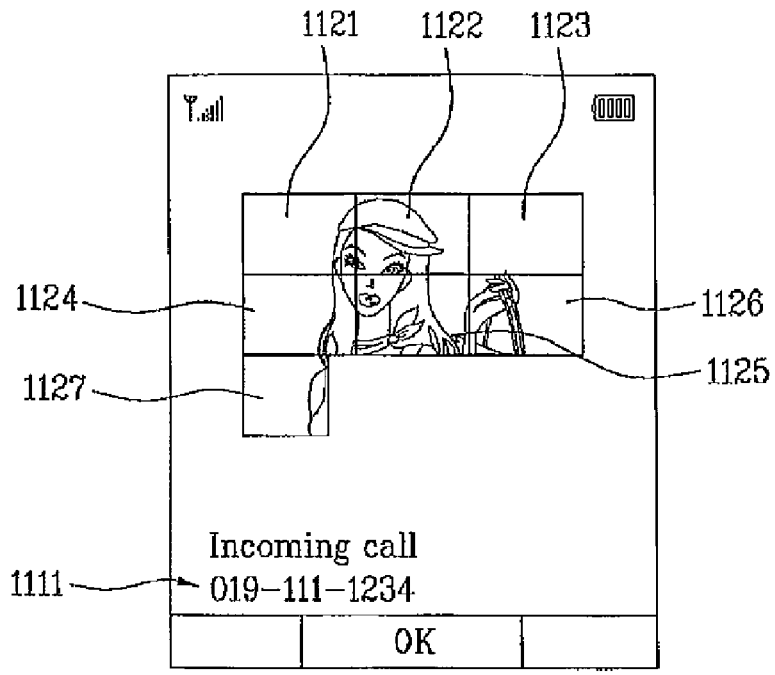
Figure 11H:
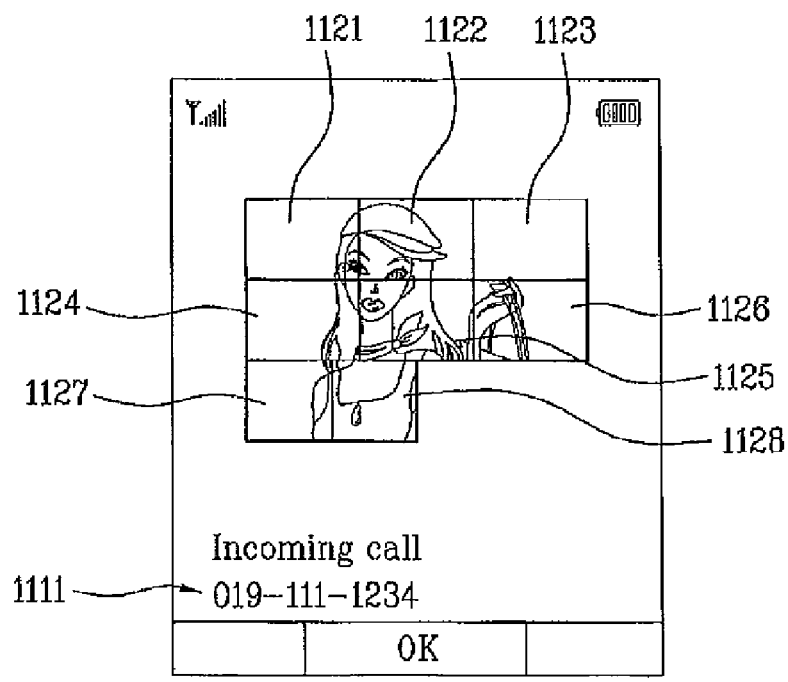
Figure 11I:
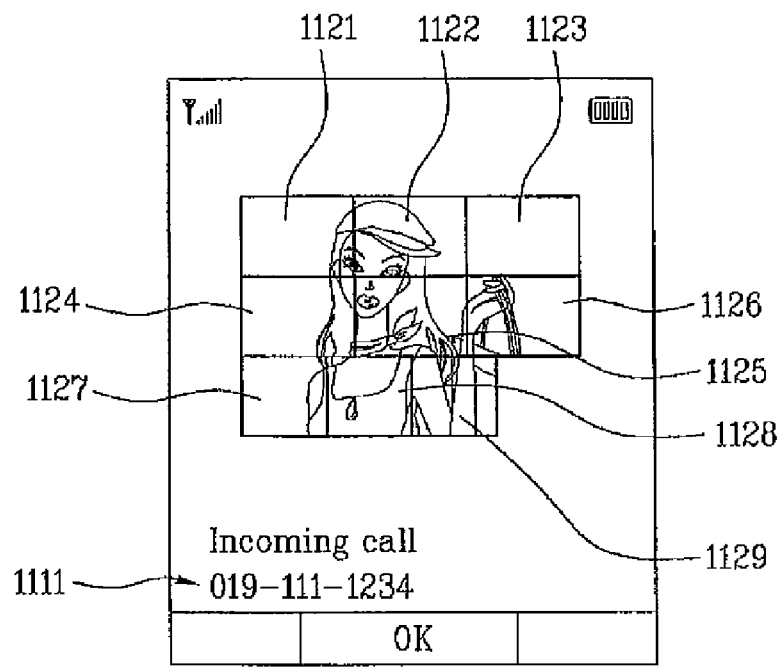
Figure 11J:
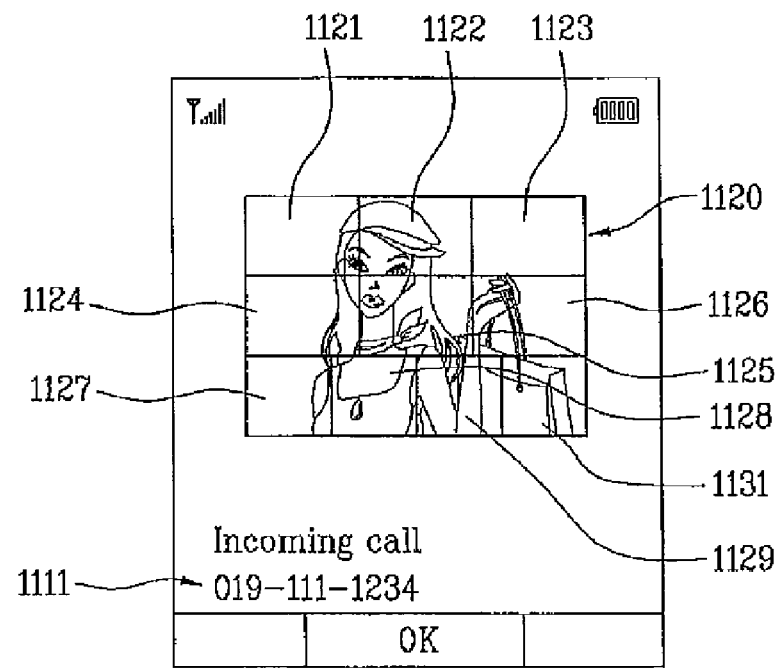
Figure 12A:
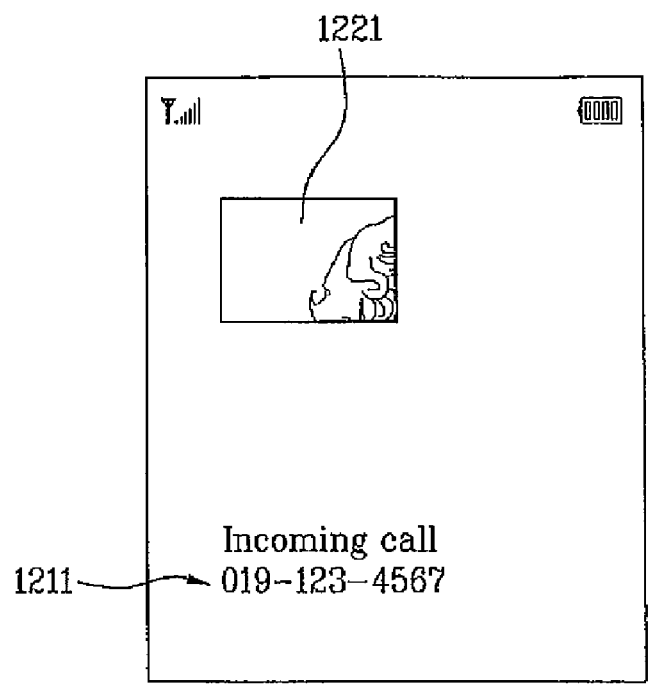
FIGS. 12A to 12D are second state diagrams of a screen to explain an image displaying method in accordance with a call signal reception in a communication terminal according to one embodiment of the present invention.
Figure 12B:
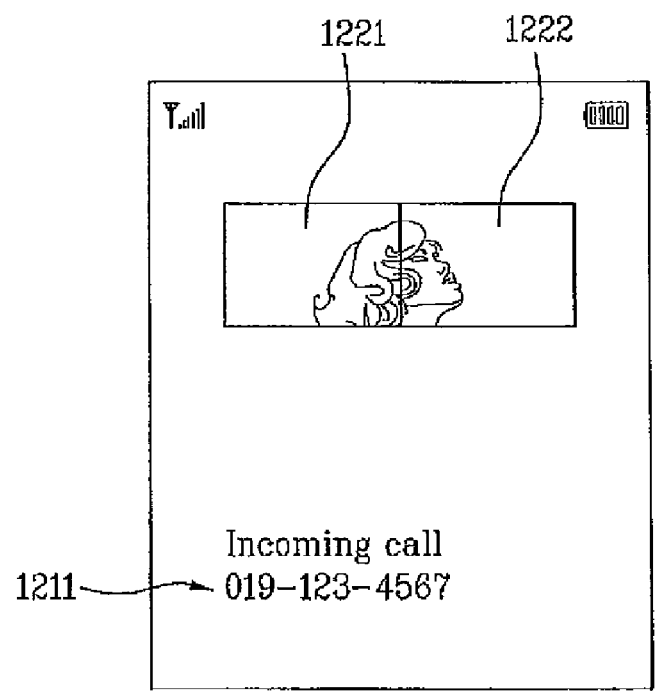
Figure 12C:
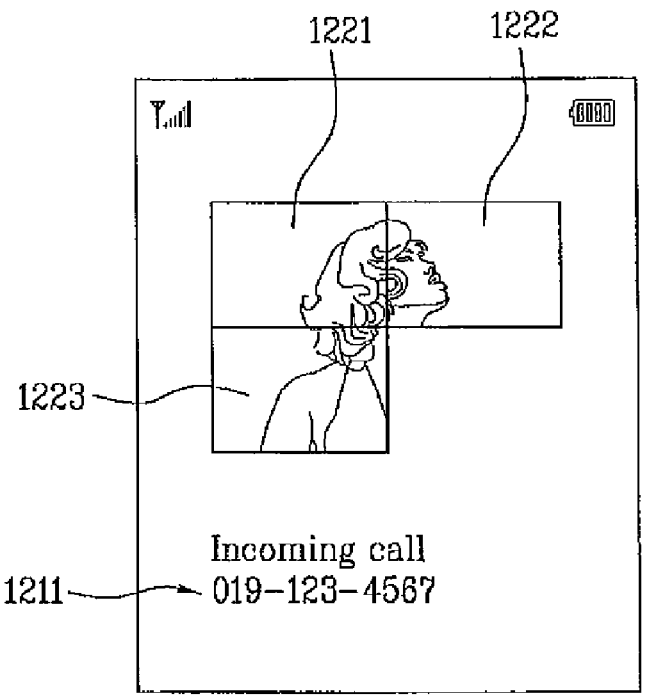
Figure 12D:
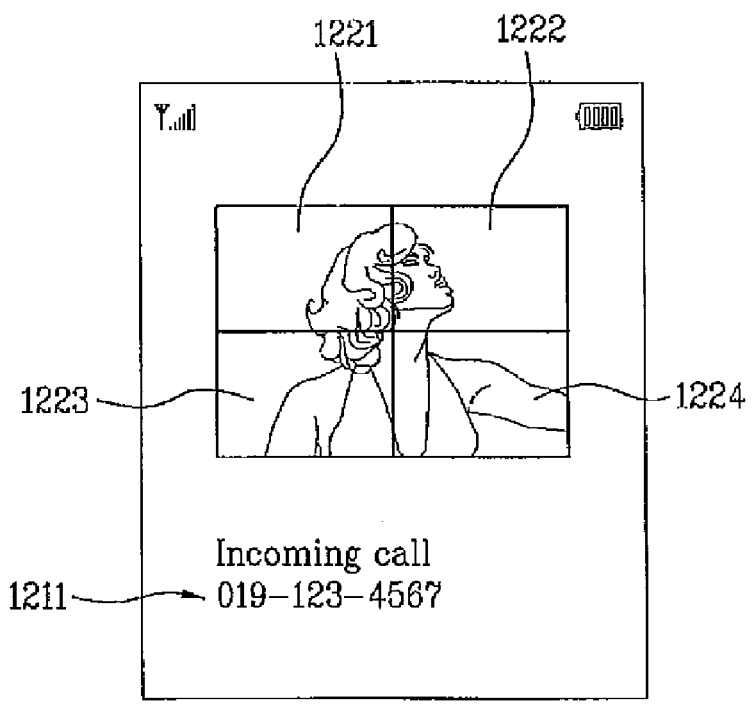

FIG. 10 is a flowchart of a displaying method in a communication terminal according to another embodiment of the present invention. For clarity and convenience of explanation, it is assumed that a communication terminal mentioned in the description of FIG. 10 can include at least one of the elements shown in FIG. 1.

Referring to FIG. 10, the communication terminal 100 sets at least one image for each phone number in accordance with user's manipulation via the user input unit 130 [S1010].

The setting step S1010 is identical to the former setting step S510 of FIG. 5. Its details will be omitted in the following description.

The communication terminal 100 receives a call signal from an external terminal via the wireless communication unit 110, and more particularly, via the mobile communication module 112 [S1020]. In this case, the call signal may include an audio call signal and a video call signal.

The communication terminal 100 searches for a phone number corresponding to the terminal having transmitted the call signal and an image that is set for the phone number [S1030].

As mentioned in the foregoing description, at least one selected from the group consisting of at least one image, at least one phone number and an image set for the at least one phone number each can be stored in the memory 160.

The communication terminal 100 sequentially displays at least one partial image configuring the image searched for in the searching step S1030. Thus, the communication terminal 100 completes the searched image [S1040].

Prior to the displaying step S1040, the communication terminal 100 is able to partition an image set per a phone number or group into at least one or more partial images. In doing so, the communication terminal 100 partitions the image into partial images amounting to a count of whole digits configuring a phone number or may partition the image into partial images amounting to an arbitrarily specified count regardless of a count of while digits configuring a phone number.

In the following description, the displaying step S1040 will be explained in detail with reference to FIGS. 11A to 11J.

FIGS. 11A to 11J are first state diagrams of a screen to explain an image displaying method in accordance with a call signal reception in a communication terminal according to one embodiment of the present invention.

First of all, the communication terminal 100 is able to complete an image set for a phone number in a manner of sequentially displaying partial images respectively matching a plurality of digits configuring a phone number in accordance with an arrangement sequence of a plurality of the digits configuring the phone number while displaying the phone number of an origination of a call signal [FIGS. 11A to 11J]. Partial images may also displayed in correspondence with number of rings (i.e., a first ring reveals a first partial image, a second ring reveals a second partial image, etc.) or other call receipt data (i.e., an initial call reveals a first partial image, a first callback reveals a second partial image, etc.)

In the following description, the displaying step S1040 will be explained in detail with reference to FIGS. 12A to 12D.

FIGS. 12A to 12D are second state diagrams of a screen to explain an image displaying method in accordance with a call signal reception in a communication terminal according to one embodiment of the present invention.

First of all, the communication terminal 100 is able to complete an image set for a phone number by sequentially displaying partial images corresponding to a count of previously stored partial images while displaying the phone number of an origination of a call signal [FIGS. 12A to 12D].

According to one embodiment of the present invention, the above-described displaying methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrierwave type implementations (e.g., transmission via Internet). And, the computer can include the controller 180 of the communication terminal.

Accordingly, the present invention provides the following effects or advantages.

First of all, the present invention provides an image set for a phone number in inputting a phone number for transmitting a call signal using a plurality of partial images, thereby breaking monotony on a screen in inputting the phone number.

Secondly, the present invention provides an image set for a phone number in receiving a call signal using a plurality of partial images, thereby providing an image relevant to a user of a terminal having sent the call signal in a puzzle format. Hence, the present invention increases visual amusement.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile communication terminal, comprising:
   a wireless communication unit configured to wirelessly communicate with at least one other terminal;
   a memory;
   a display;
   a user input unit configured to enable a user to input a plurality of digits for communicating with the at least one other terminal; and
   a controller operatively connected to the wireless communication unit, memory, display and user input unit, the controller configured to
   associate an image stored in the memory with a plurality of digits sequentially input corresponding to a particular contact included in a contacts list of the mobile terminal,
   retrieve from the memory and display on the display a list of candidate phone numbers in response to the sequential input when the sequential input corresponds to a subset of the candidate phone numbers,
   select one phone number from the list of candidate phone numbers when a next digit is sequentially input resulting in said one phone number matching all digits input,
   determine how many digits are left of the selected one phone number that have not yet been input,
   divide the image into a number of portions corresponding to how many digits are left of the selected phone number, and
   sequentially display on the display the divided number of portions of the image in response to the rest of digits of the selected phone number being input.

2. The mobile communication terminal of claim 1, wherein the controller is configured to transmit, via the wireless communication unit, a call signal corresponding to the selected one phone number.

3. The mobile communication terminal of claim 2, wherein the controller is configured to automatically transmit the call signal when all portions of the image are displayed.

4. The mobile communication terminal of claim 2, wherein the wireless communication unit is configured to receive an incoming phone call, and
   wherein the controller is configured to
   associate the image stored in the memory with digits of a phone number of the incoming phone call, and
   sequentially display on the display the one or more partial images of the image.

5. The mobile communication terminal of claim 1, further comprising:
   a touchscreen that encompasses the display and the user input unit.

6. The mobile communication terminal of claim 1, wherein the controller is configured to associate one of a default image and a unique image with the plurality of digits as the image.

7. A method of controlling a mobile communication terminal, the method comprising:
   allowing, via a wireless communication unit of the mobile terminal, wireless communication with at least one other terminal;
   enabling, via a user input unit of the mobile terminal, a user to input a plurality of digits for communicating with the at least one other terminal;
   associating, via a controller of the mobile terminal, an image stored in a memory of the mobile terminal with a plurality of digits corresponding to a particular contact included in a contacts list of the mobile terminal;
   retrieving from the memory and display on the display a list of candidate phone numbers in response to the sequential input when the sequential input corresponds to a subset of the candidate phone numbers;
   selecting one phone number from the list of candidate phone numbers when a next digit is sequentially input resulting in said one phone number matching all digits input;
   determining how many digits are left of the selected one phone number that have not yet been input;
   dividing the image into a number of portions corresponding to how many digits are left of the selected phone number; and
   sequentially displaying on the display the divided number of portions of the image in response to the rest of digits of the selected phone number being input.

8. The method of claim 7, further comprising:
   transmitting, via the wireless communication unit, a call signal corresponding to the selected phone number.

9. The method of claim 8, further comprising:
   automatically transmitting the call signal when all portions of the image are displayed.

10. The method of claim 8, further comprising:
    receiving an incoming phone call;
    associating the image stored in the memory with digits of a phone number of the incoming phone call; and
    sequentially displaying on the display the one or more partial images of the image.

11. The method of claim 7, wherein the display and the user input unit comprise a touchscreen.

12. The method of claim 7, further comprising:
    associating one of a default image and a unique image with the plurality of digits as the image.

* * * * *